United States Patent [19]

Webster et al.

[11] Patent Number: 4,892,031
[45] Date of Patent: Jan. 9, 1990

[54] MODULARIZED CUSTOM BEVERAGE BREWER

[75] Inventors: Joseph P. Webster; William L. Gustafson, both of St. Charles, Mo.

[73] Assignee: Newco Research Corporation, St. Charles, Mo.

[21] Appl. No.: 345,365

[22] Filed: May 1, 1989

Related U.S. Application Data

[63] Continuation of Ser. No. 41,878, Apr. 23, 1987, Pat. No. 4,829,888.

[51] Int. Cl.[4] ............................................. A47J 31/00
[52] U.S. Cl. ........................................ 99/284; 99/295
[58] Field of Search ................. 99/279, 280, 281, 282, 99/283, 284, 288, 290, 291, 295, 304, 306, 307, 316; 426/433

[56] References Cited

U.S. PATENT DOCUMENTS

| | | | |
|---|---|---|---|
| 3,218,955 | 11/1965 | Lorang | 99/281 |
| 3,319,561 | 5/1967 | Bloomfield | 99/283 |
| 4,054,085 | 10/1977 | Tarr | 99/284 |
| 4,478,139 | 10/1984 | Zimmerman | 99/280 |
| 4,603,620 | 8/1986 | Daugherty | 99/284 |
| 4,621,571 | 11/1986 | Roberts | 99/295 |

Primary Examiner—Robert W. Jenkins
Attorney, Agent, or Firm—Paul M. Denk

[57] ABSTRACT

A modularized fabricated custom formed beverage brewer of the type incorporating a component housing containing a hot water heating tank regulated by controls, with the heated water from the tank being further transferred to a spray head assembly, for discharge onto a basket of beverage grounds for dripping of a brewed beverage into a decanter for its consumption, the housing receiving its water from a cold water inlet or by a pour-in deliver of water, the housing being convertible for multiple usage through replacement and relocation of select of its components, the housing incorporating a base member, an upright column, and an upper cantilevered portion, the housing being formed for disposition either as front, left, or right side delivery form of brewer, legs may be provided for supporting the housing, and additional or multiple warming units may be coupled with the housing to facilitate its convenient usage.

20 Claims, 24 Drawing Sheets

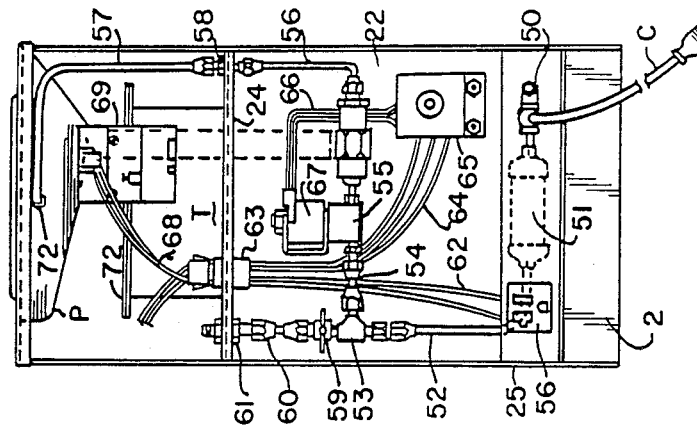
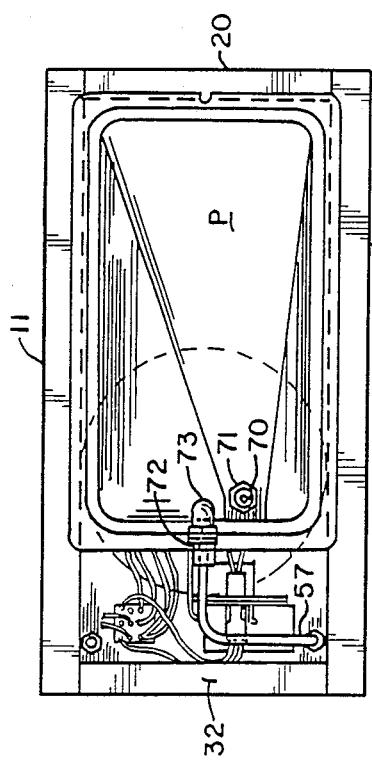
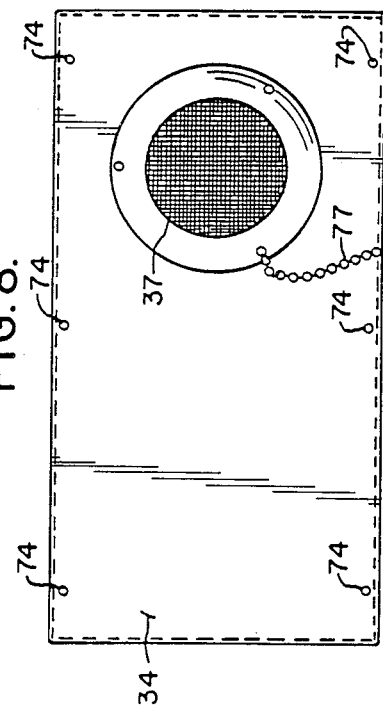
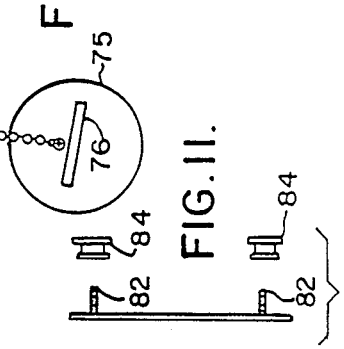
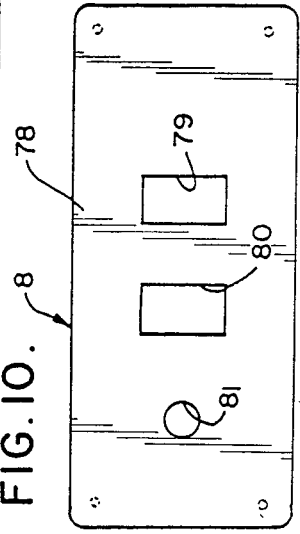

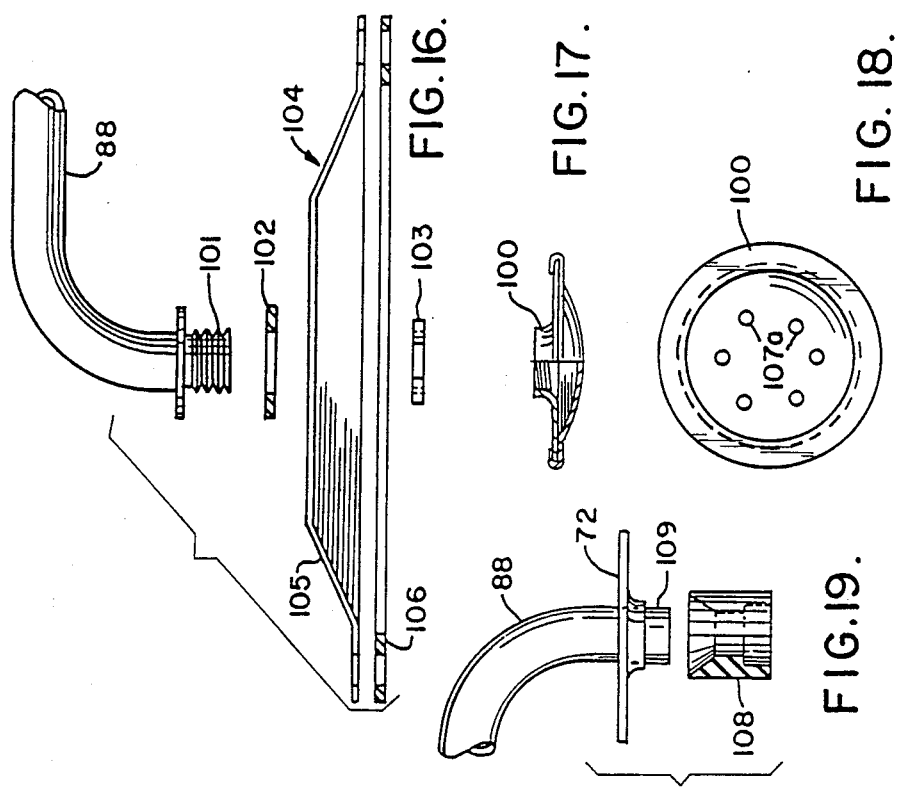
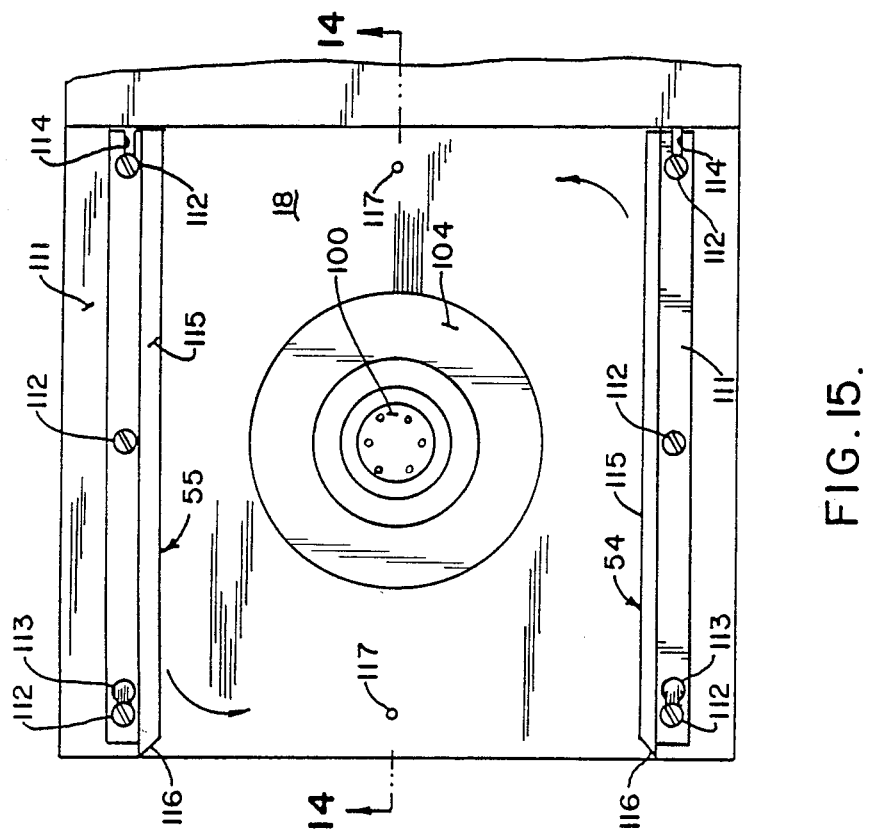

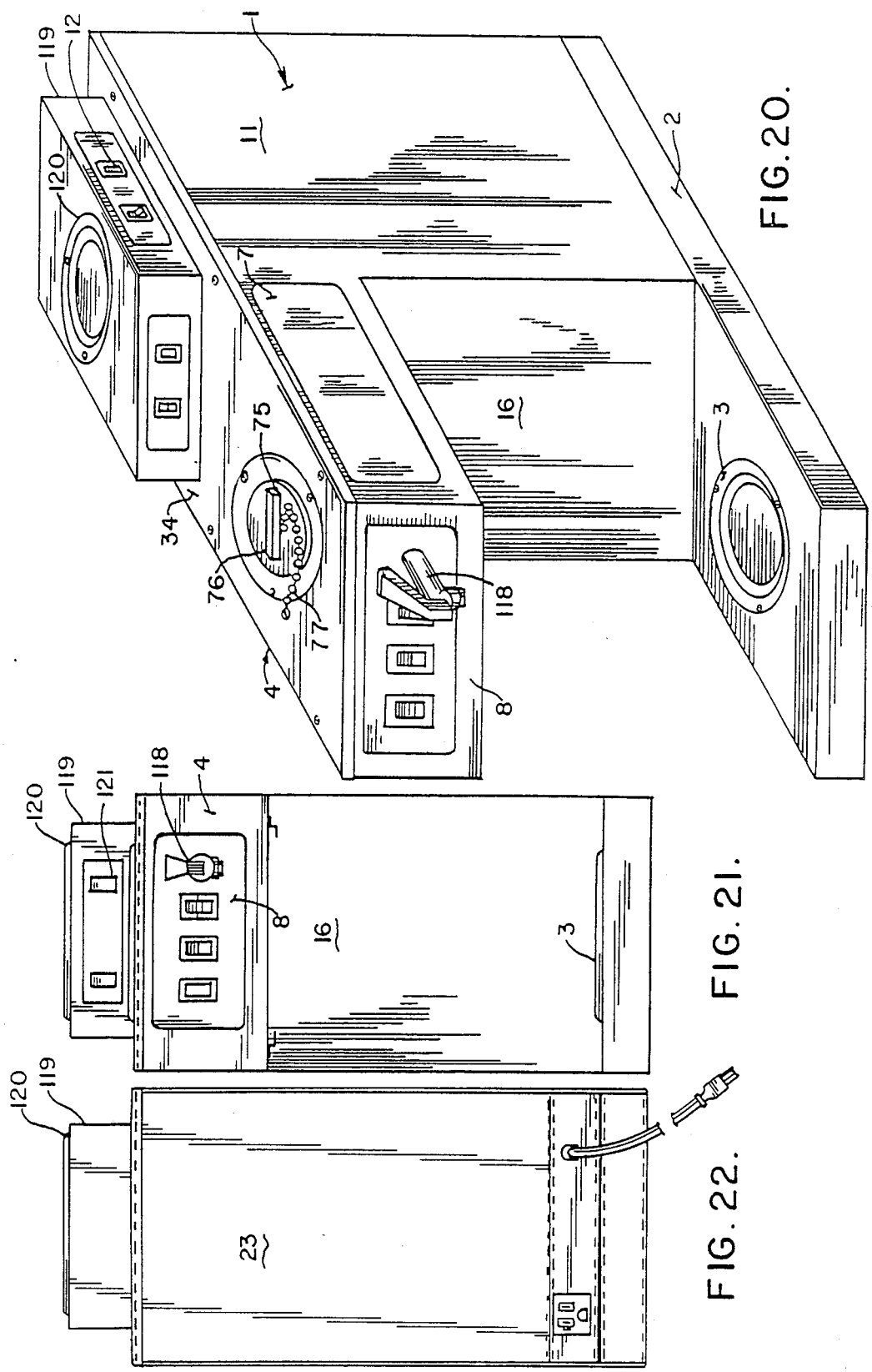

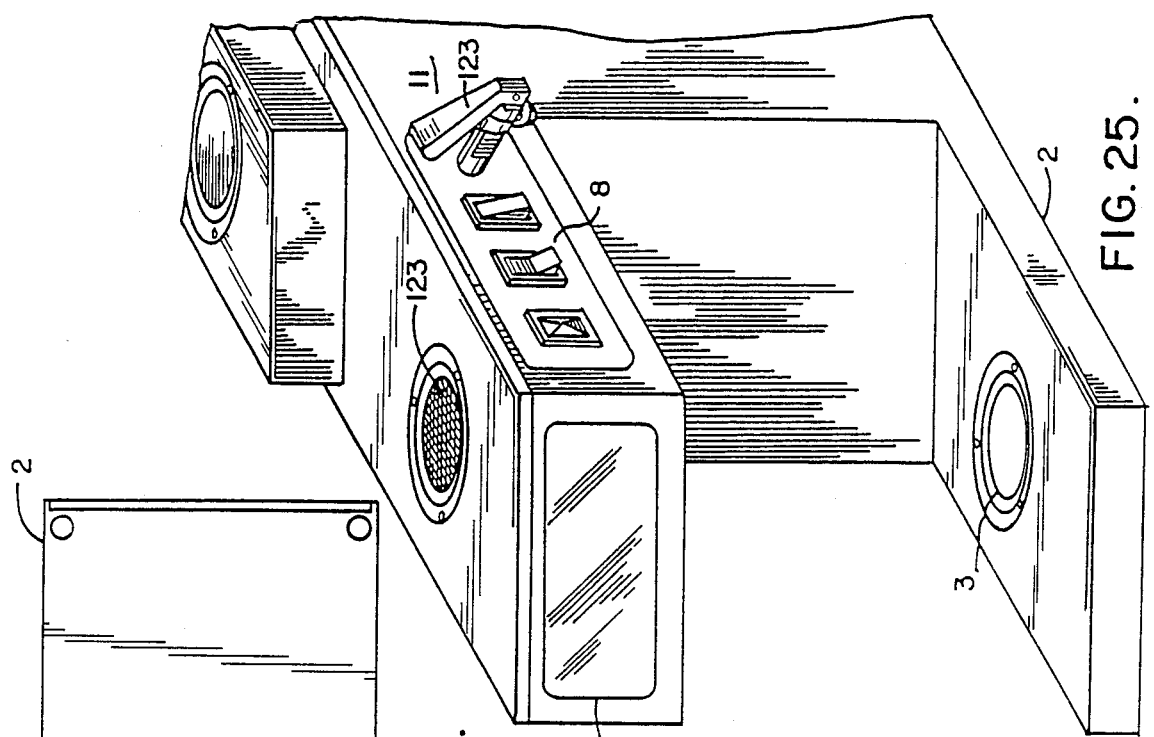
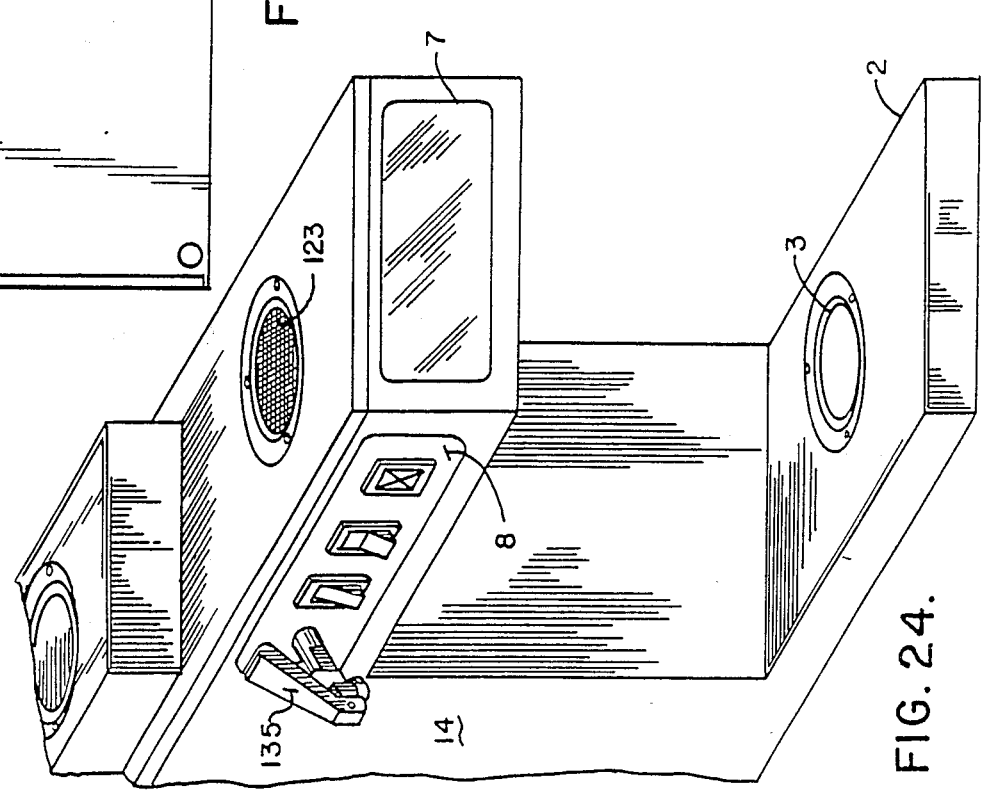

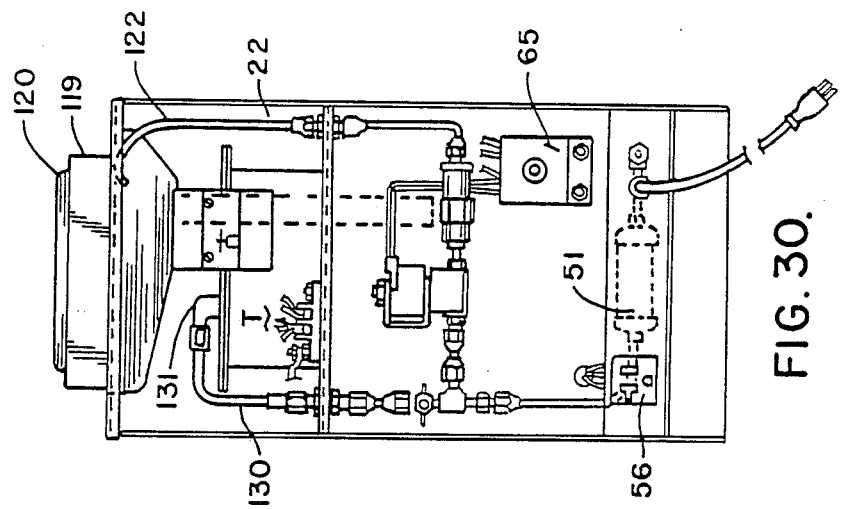
FIG. 30.
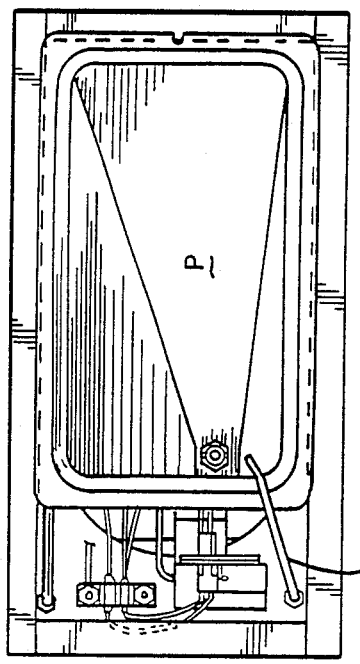
FIG. 27.
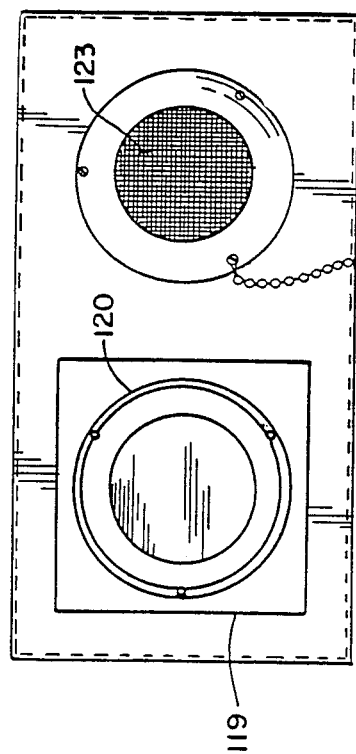
FIG. 26.
FIG. 29.
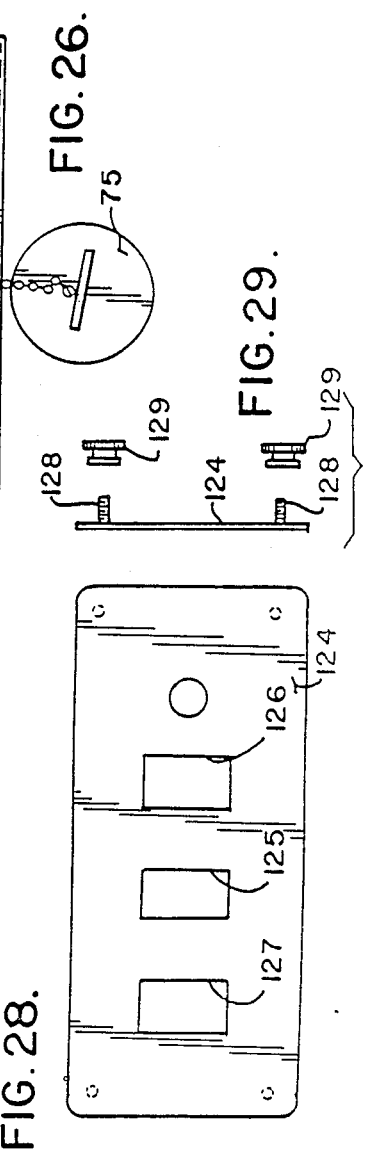
FIG. 28.

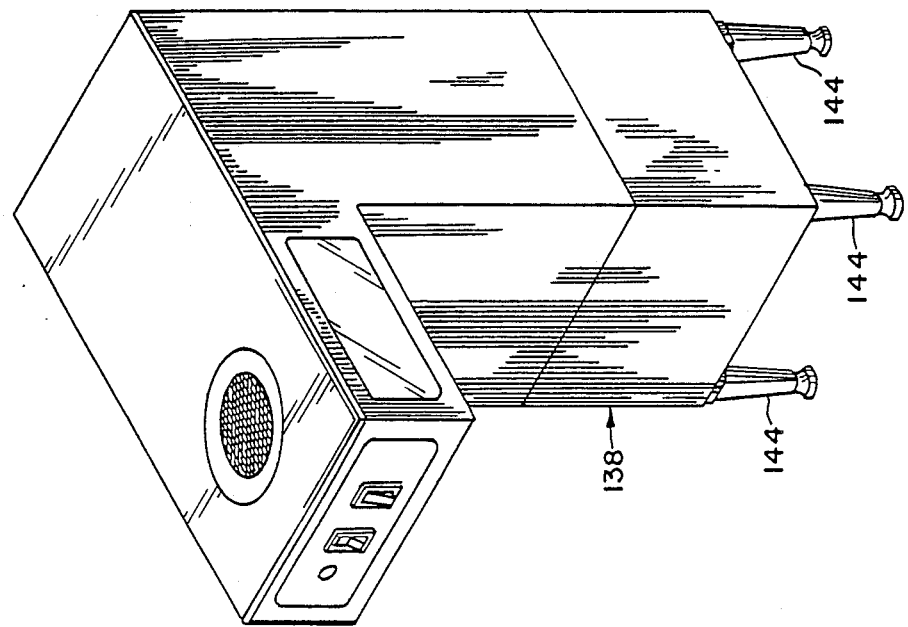
FIG. 36.
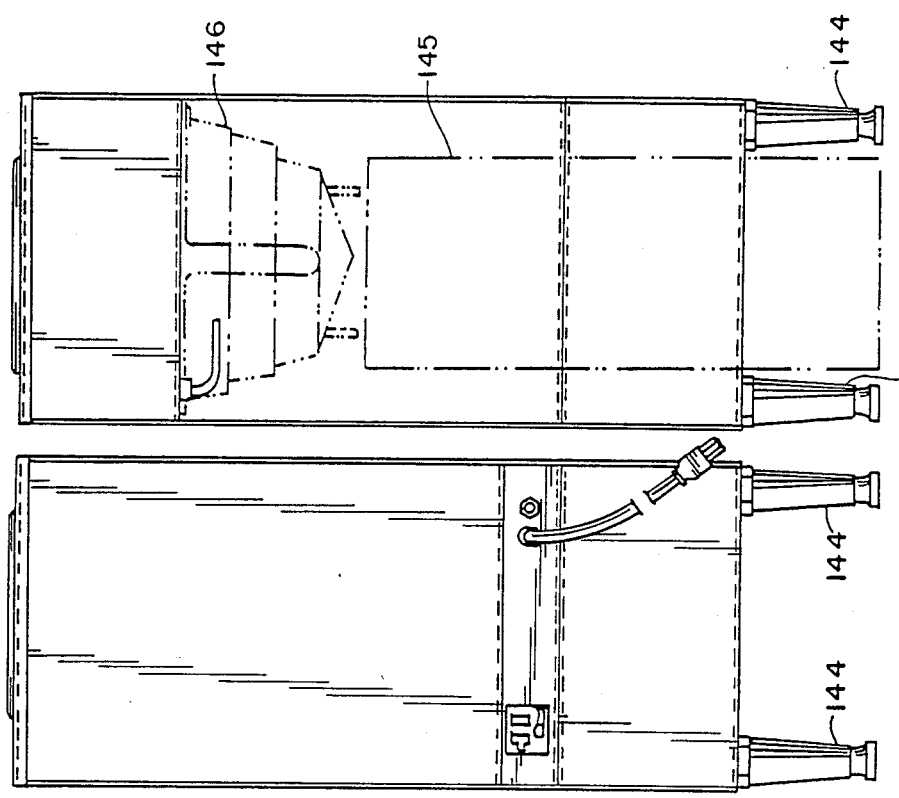
FIG. 37.
FIG. 38.

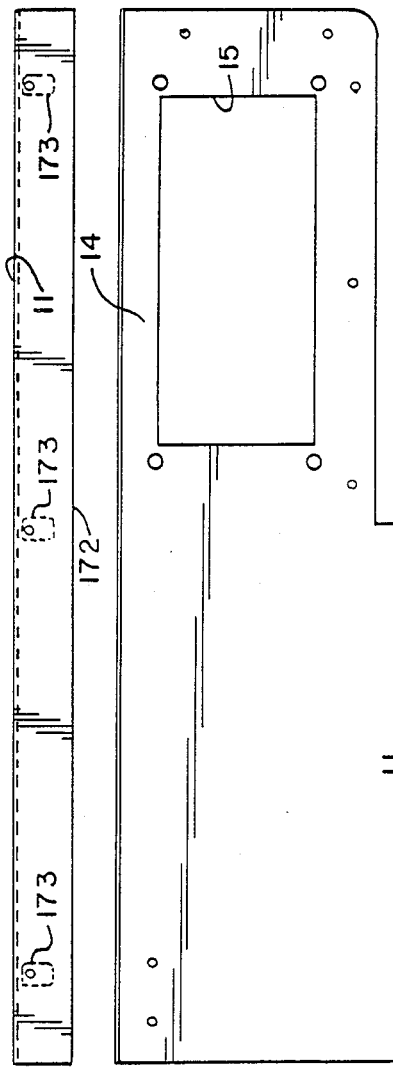
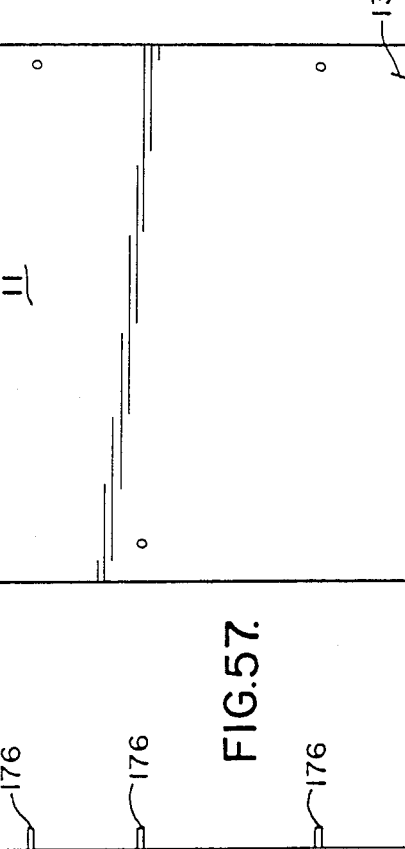
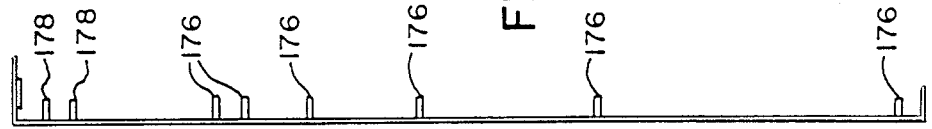
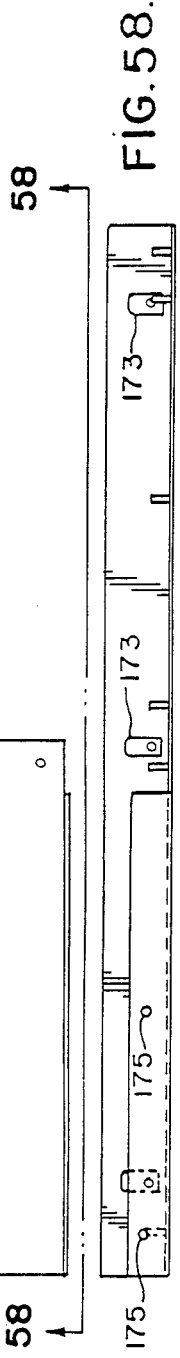

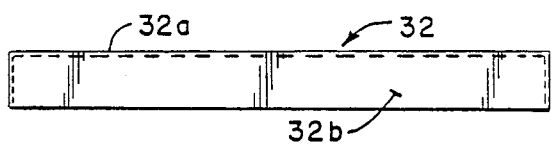
FIG.62.
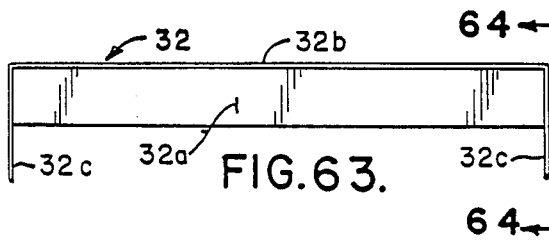
FIG.63.
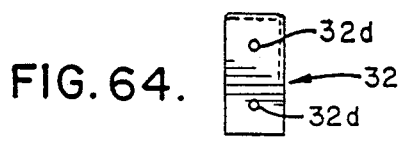
FIG.64.
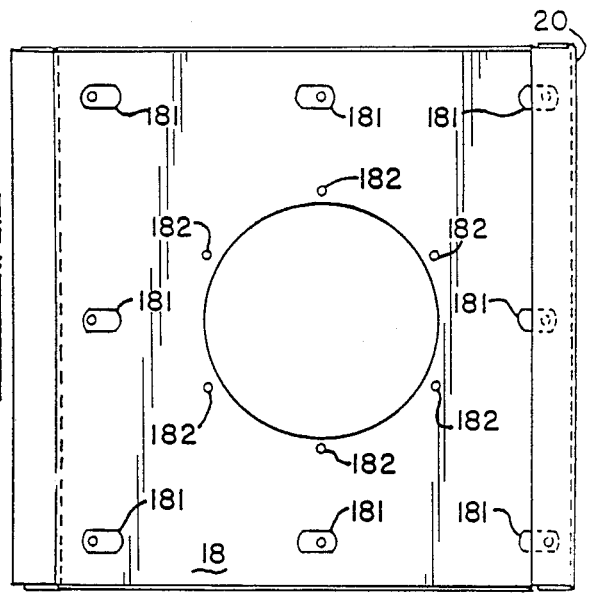
FIG.59.
FIG.60.
FIG.61.
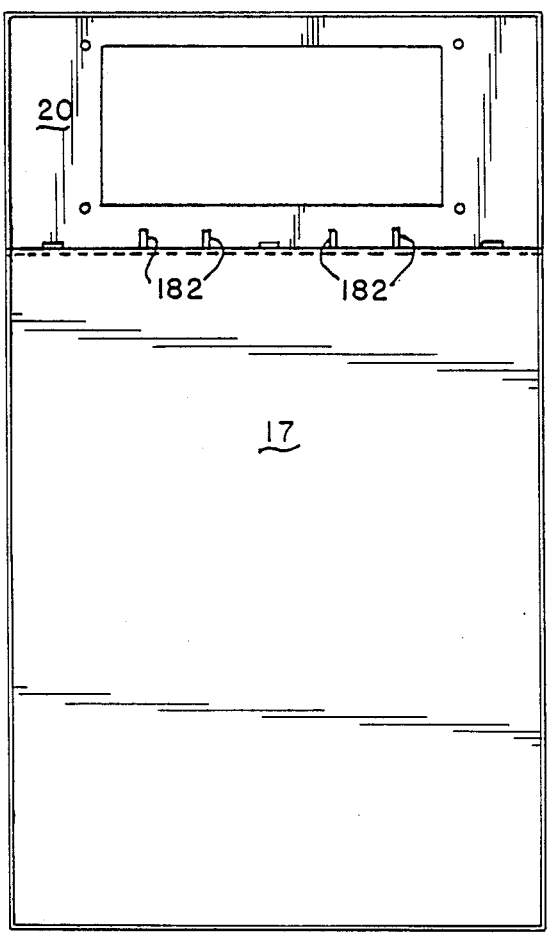
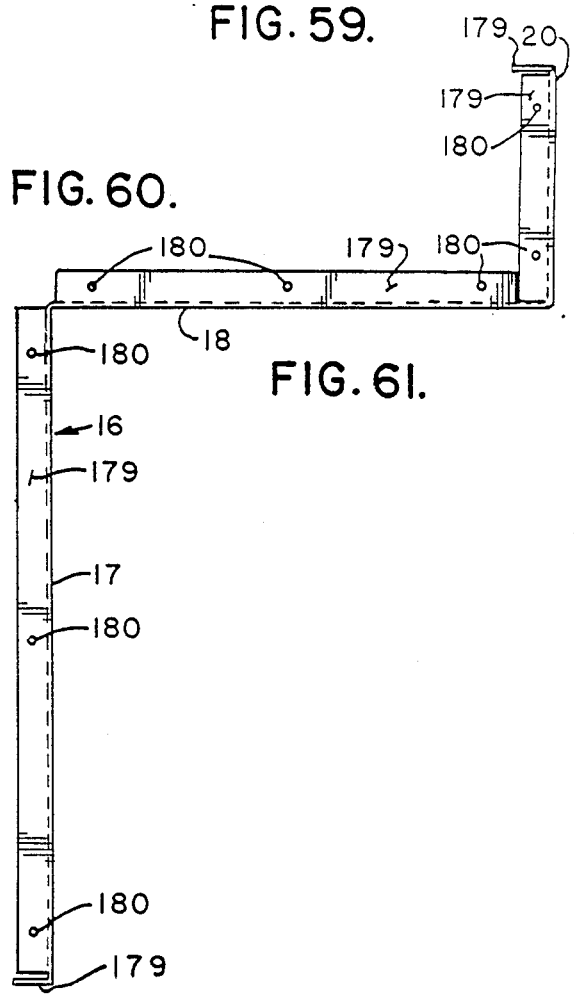

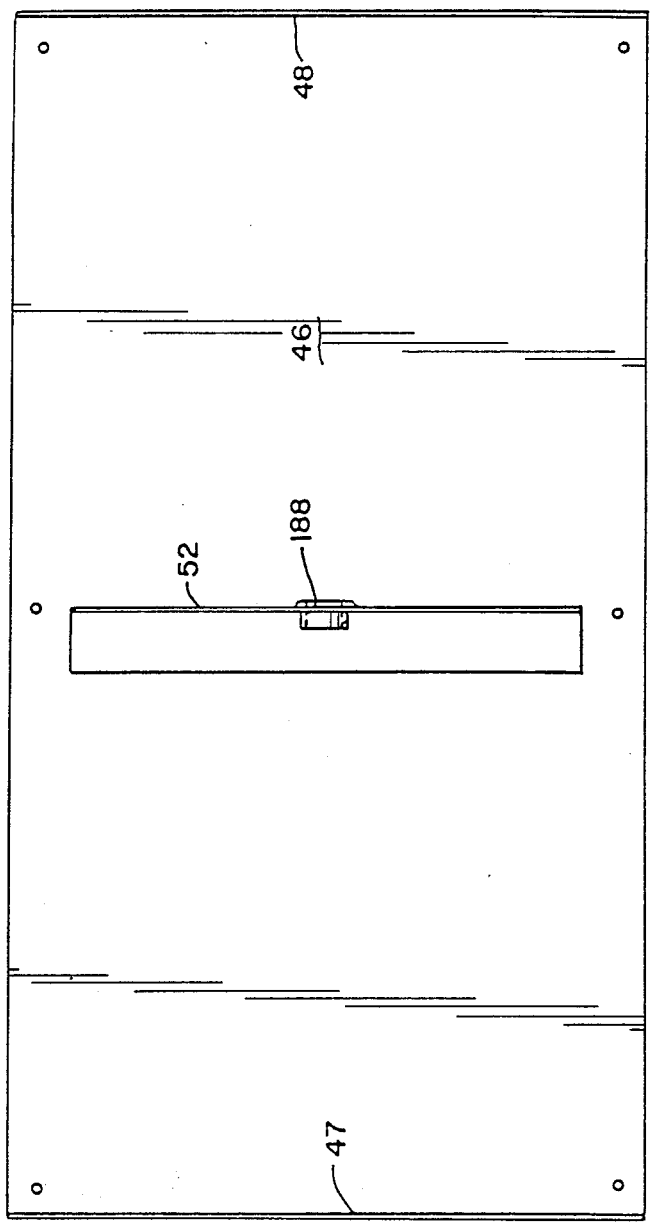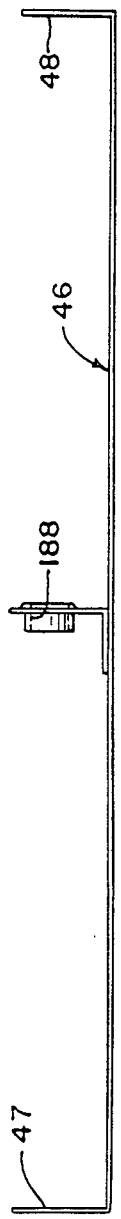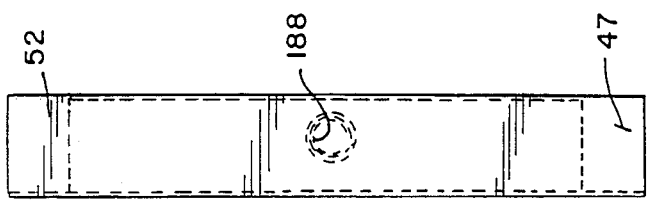
FIG.68.
FIG.70.
FIG.69.

MODULARIZED CUSTOM BEVERAGE BREWER

CROSS-REFERENCE TO RELATED APPLICATION

This application comprises a continuation of U.S. patent application Ser. No. 041,878, filed on Apr. 12, 1987, now U.S. Pat. No. 4,829,888, both of which applications are owned by a common assignee.

BACKGROUND OF THE INVENTION

This invention relates generally to means for modularizing the construction of a custom fabricated beverage brewer for use in the making of coffee, tea, for heating water, and for related types of brewing, wherein the assembly can be easily fabricated from prefabricated components, the brewer being modified for differing uses, and can be easily serviced through the replacement of premanufactured parts such as require replacement during servicing.

There are a great number of beverage brewers, particularly of the coffee type, that have long been available upon the market. Examples of some of the earlier coffee making machines are shown in Bunn U.S. Pat. No. RE. 25,663. Other earlier patents include those to the same inventor, under U.S. Pat. Nos. 3,034,417, 3,100,434, 3,793,935, 3,610,132, 3,593,650, 3,608,471, 3,450,024, 3,691,932, 3,385,201, 3,336,856, 3,220,334, 3,149,556, 2,551,219, 2,561,134, 3,425,337, 3,425,338, 3,369,477, and 3,959,502. Earlier patents to the same or other inventors upon related inventions are shown in the U.S. Pat. Nos. 3,771,432, 3,793,934, 3,736,155, 3,691,933, 3,608,471, 3,593,650, 3,385,201, 3,336,856, 3,220,334, 3,425,337, 3,369,477, and 3,425,338. Most of the foregoing patents show early embodiments for coffee brewing devices wherein the hot water overflow, the cold water pour-in, or the siphoning type of coffee making principles were embodied within their respectively shown apparatuses.

Design patents relating to this technology include No. Des. 274,029, No. Des. 229,897, No. Des. 239,756, No. Des. 239,757, No. Des. 241,219, No. Des. 269,325, and No. Des. 280,377.

Of more recent vintage are coffee brewing apparatus wherein controls for its operations such as through electronic means are shown. These are shown in such United States patents as Martin U.S. Pat. No. 3,494,276, which is upon a cold water pour-in beverage apparatus. This is a type wherein cold water poured into its hot water tank displaces previously heated water, thereby allowing for the overflow of the hot water to its spray head assembly for brewing of coffee contained within a basket and for its dripping into its available decanter.

The Daugherty U.S. Pat. No. 4,413,552, shows another form of coffee making machine, wherein its cold water basin is integrally formed with the upper contiguous edge of the hot water tank, such that its basin mates with the upper edge of said tank in its assembly and location within the shown coffee making machine.

The Stover U.S. Pat. No. 4,464,981, shows another form of beverage making machine with hot water faucet, wherein, in this particular instance, the hot water faucet draws its heated water directly from its hot water tank, thereby potentially giving rise to a miscalculation or disruption in the precise quantity of hot water delivered to its spray head assembly, during the coffee brewing process.

The Daugherty U.S. Pat. No. 4,476,775, shows another variation upon a coffee making machine. In this particular instance, the hot water tank of this device is a one piece and integral, inverted L-shaped receptacle, having its cold water basin, and the hot water tank, formed as a single unit. Its cold water basin has an opening therein that mates with the top opening of its hot water tank. One of the problems associated with this type of device is that it does require and necessitate the inclusion of a vent tube, of the type as shown therein, in order to prevent the development of pressure, or a vacuum source, that can disrupt and designed operations for the machine during its coffee brewing process.

The Zimmerman U.S. Pat. No. 4,478,139, shows a beverage making machine, and defines a combination of either an automatic or cold water pour-in brewing apparatus. It also incorporates various opening and closing valve means for regulating the flow of cold water through the cold water in line, and into the machine basin.

The Daugherty U.S. Pat. No. 4,503,757, shows a beverage brewing apparatus, which is basically upon the application of a bracket as mounted onto its tank cover, of the hot water reservoir, as disposed within the upper portion of its housing, with the bracket having a terminal block mounted upon it, and including a regulatable thermostat in combination with numerous conductors for providing electrical connection of the tank with its housing and electrical source.

The Martin U.S. Pat. No. 3,736,155, shows another form of cold water pour-in beverage maker with blanket heater and bi-metallic thermostat, for regulating and controlling the heating of the water within its shown water tank.

The Martin U.S. Pat. No. 3,691,933, discloses another form of automatic coffee brewer with liquid level sensor. A further Martin U.S. Pat. No. 3,793,935, shows another form of automatic coffee maker with liquid level sensor and siphon control.

Finally, the Stover U.S. Pat. No. 4,531,046, is upon a beverage brewing apparatus with constant temperature water reservoir. It includes a temperature sensing element, in the form of a thermistor, disposed within a hollow heat conductive tube that extends into its hot water tank, in order to provide temperature control of the water therein through a regulation of its heating element.

SUMMARY OF THE INVENTION

This invention relates principally to beverage brewers, and more specifically pertains to a modularized custom beverage brewer which is fabricated of various components that are interchangable to provide a brewer that may have a wide variety of usage and application in the restaurant and related businesses, and be used under a variety of conditions through constructive modifications for servicing various sized decanters depending upon the uniqueness of the installation.

This invention contemplates the formation of a beverage brewer, and whether it be used for the brewing of coffee, tea, or related substances, and is formed, from an outward appearance, to be assembled to a similar shape to that of many of beverage brewers currently upon the market, but in practice, comprises a fabricated style of brewer formed from a variety of preshaped wall components, that are fabricated into a base member, an upright column means, and an upper cantilevered portion, with these various walls and other components being easily removable, and replaceable, as desired, and as required. For example, the upper cantilevered portion of this identified brewer is shaped having a front wall, and parts of the side walls for the housing, and apertures are provided at various predetermined locations within and through these various walls, with said brewer being adaptable to provide for either the front, left, or right side delivery of a decanter to the brewer, and the installation of a control switch panel, upon one of the identified wall apertures, in order to conveniently arrange the on-off and brew switches for the device conveniently disposed at a location where the restaurant service people can easily have access to the same, during operations of the apparatus. Where the remaining apertures are disposed through the other walls of the cantilevered portion, dummy plate means may be installed thereon, so as to close them off, and provide a rather streamlined appearance for the brewer, at these other locations.

In addition, the control switch panel means may also include means for mounting of a faucet, which provides for the dispensing of hot water simply upon the manipulation of its handle by the user. To achieve the foregoing results, and to further accommodate the user of this instrument and add to their convenience, the underside of the cantilevered portion for the brewer includes the usual pair of basket rails, of the type that are designed for accommodating the sliding insertion and fitting of the brew basket, its filter, and the grounds thereto, but in this particular instance, these rails are replaceable, and can be located either in a front-to-back configuration, as when the brewer is installed head on, and used in that manner, or the rails can be removed, and relocated in a side-to-side configuration, for providing for the side delivery of the brew basket, and the decanter, to the beverage brewer, during its installation and application. In other words, the beverage brewer of this invention, and its housing, is completely convertible for multiple usage through the replacement and relocation of select of its components during the initial assembly of the brewer housing, in its preparation for application within the restaurant.

As previously explained, this beverage brewer is fabricated of modular components, so that it can be assembled for application for a variety of types of uses and applications, either as a front on beverage brewer, or a left or right side installation, as may be desired by the user, and which may be dictated by the circumstances of the space available for its installation.

The housing for this brewer further includes means for interchanging of its base member, with one base member, which may be removable from the underside of its upright column means, provides for the lower and more standard style cantilevered form of base member, that extends forwardly of the upright column, and generally exposes a heating or warming unit thereon, and upon which a decanter may be applied, for reception of the brewed beverage during its making. These type bases allow for the deposit of the decanter thereon, to sustain the warming of its contained beverage, after its brewing, and while awaiting its dispensing and consumption. In addition, this type of a cantilevered lower base member may be removed, as an indication of the modular aspects of this invention, and replaced by a vertically extending type of housing, that simply extends the height of the upright column means, in order to increase the height of the base member, and the column means, and for that matter the entire beverage brewer, so that decanters of greater height may be used thereunder, as when a beverage is being brewed for direct deposit into an airpot, or tea decanter, of the type that usually have significantly more height and/or volume of liquid than the average coffee beaker or decanter. Thus, a simple removal of one base member, by another, readily converts the entire beverage brewer to one that has further usage and application as compared to that which is normally available in the standard brewer in the prior art. In addition, where even further or greater height may be required for the brewer, it is likely that legs may be installed onto the underside of the added base of the upright column means, or its extension, to add further extended height to the brewer, for accommodating a decanter of any predetermined height or size.

The internal components for the beverage brewer of this invention includes a style of hot water heating tank, that is regulated by a variety of controls in the category of a thermostat, water supply valve, timer, and related electronic components, that are useful in application for regulating the precise heating of water and brewing of beverages as required. Generally, to further add to the facility of this apparatus, a rear support panel is removably secured within the said upright column means of the invention. Said support panel is disposed for holding select of the controls as previously alluded to, and with said support panel, and its held controls, being readily removable from the brewer, in order to facilitate the servicing of the device, during usage. Likewise, the support panel is shaped including a variety of components, including upper and lower flanges, in order to reinforce the same, in its installation, and likewise, the flanges are designed for accommodating the mounting of various other controls, such as an electrical plug-in outlet, in addition to the main electrical supply cable leading to the apparatus, and which provides electrical energy for its operations. Furthermore, the support panel is designed for mounting of the rear wall or panel for the back wall of the device, to provide it support in its installation and in the furnishing of the rear closure for the apparatus, during assembly.

Further internal controls and mechanisms applied during the installation of this apparatus include, as previously explained, the hot water heating tank, having the heater disposed therein, and which tank further mounts other controls, with the entire tank, and all of its supply lines, being readily and easily removable, when replacement may be required as due to deterioration or malfunctioning of any one component. Thus, servicing of this apparatus may be conveniently and facilely done by the service man, mainly expedited through replacement of the entire modularized components. The device further includes a series of walls, such as a pair of left and right side walls, a staggered shaped front wall, a top wall, and which top wall may further include various instruments thereon, such as the intake port for accommodating the pour-in of cold water when the device is used in that manner, or may further include either, or in addition, other warming units thereon, furnishing means for holding a beaker of freshly brewed coffee or tea, to keep it heated, until consumption. In addition, a further housing may be mounted thereon, at a rearward segment of the top wall, and have another warming unit installed thereat, so as to provide a slightly elevated disposition for yet another decanter of beverage, and keep it warmed, until usage.

The base member for this invention includes an upper support, formed as an upwardly disposed plate, having integral side flanges formed extending downwardly therefrom, and a lower plate that is removably secured to said upper support, generally by means of fasteners, which in the preferred embodiment, the fasteners are formed as mounts, that threadedly engage the base member into an integral structure, with the mounts likewise forming the legs for the entire brewer assembly once installed. An upright wall formed across the lower plate of the base member provides a segregation between a front and back spacing within the base member, so that the heat formed and generated by the warming unit installed upon the front and upper surface of the upper support, does not migrate to its rearward segment thereof, nor cause any deterioration to the electronic and electrical controls installed in proximity therewith, as upon the rear support panel, as previously explained.

Further attributes of this invention include the disposition of a separate water heater within the water heating vessel or tank, and which preferably may be formed as a coiled tube heater, with a separate and independent source of water supplying water directly to the coiled heater, for delivery of hot water to the aforementioned faucet, or elsewhere for usage, as required. Thus, by supplying an auxiliary source of heated water through usage of this designed apparatus, the control of the water delivered to the hot water tank, and whether it be by means of a pour-in style of initiation of a brewing cycle, or by means of the automatic cold water inlet supply mode employed for a brewing cycle, the water furnished by these two modes of brewing operation is not impaired when hot water may be supplied by the auxiliary means to its faucet as a source of supplemental heated water for usage by the consumer.

It is, therefore, the principal object of this invention to provide a modularized form of custom beverage brewer which, during its assembly, can be fabricated or modified to adapt its form for application to the particular type of installation required.

Another object of this invention is to provide a beverage brewer which can be assembled for front, left or right side delivery of its decanter of beverage, and the corresponding insertion or removal of its brew basket.

A further benefit of this invention is exhibited through the ease of interchanging the setting for this beverage brewer from either a front or side delivery and control type of apparatus.

A further object of this invention is to provide a beverage brewer readily assembled from the modular form of components, fabricated from a variety of removable wall structures, so that the device can be shipped as a composite of parts, and easily assembled into that type of installation desired by the user.

A further object of this invention is to provide a beverage brewer in which its various components can be readily removed, and replaced by other components, which may convert the brewer from the standard style coffee brewer, to a high rise type of beverage brewer that can accommodate the direct brewing of tea, or other beverages, into an airpot, or a hightened and elongated decanter.

Another object of this invention is to provide a beverage brewer where its intake water pan, or bowl, in addition to its water heating tank, and any controls mounted thereon, may be easily and facilely removed, as required for installation and servicing.

Another object of this invention is to provide a beverage brewer in which an auxiliary hot water supply, through the arrangement of a separate water flow tube, such as a coil tube, disposed within the water heating tank, can be furnished with a totally discrete supply of heat, for heating a supplemental supply of water, thereby obviating the need to draw upon the normal supply of heated water contained within the water tank and which is generally gauged for precise usage and application in the brewing of a decanter of a beverage, such as coffee, tea, or the like, and not for draw off by an auxiliary faucet. A further object of this invention is to provide means for adding additional warming units to the upper or top surface or wall of the beverage brewer, through the application of supplemental housing means, for support of other warming units, in a staggered fashion, so as to add to the convenience for deposit or removal of other beakers of coffee, or the like, therefrom.

Another object of this invention is to provide a single or double warming unit housing for functioning as an auxiliary or lateral mount to a beverage brewer for accommodating additional freshly brewed beakers of coffee, or the like, for ready delivery by the user, such as the waitress of waiter within a restaurant.

Another object of this invention is to facilitate the interchangability of all tank and heating elements contained within a custom fabricated beverage brewer.

Another object of this invention is to add to the interchangability of all warmers and switches contained within a beverage brewer.

A further advantage of this invention is to add to the interchangability and replacement of all control valves within a beverage brewer.

A further object of this invention is to add to the interchangability of the brew baskets, their mounting rails, and the spray heads used in association therewith.

Yet another object of this invention is to provide for the ease of conversion from a pour-over style to an automatic brewing type of beverage brewer, all of which conversions are designed for easy installation into the brewer during its initial fabrication.

A further object of this invention is to provide a brewer that can be easily converted into an airpot brewer.

Another object of this invention is to provide a brewer that can be easily converted to a tea brewer.

Yet another object of this invention is to provide for the conversion of the warmer assembly for a brewer from a single warmer to a multi or six warmer installation.

Still another object of this invention is to provide a beverage brewer that can easily accommodate one or more auxiliary faucets for furnishing heated, or even cold, water for supplemental usage other than for brewing purposes.

Yet another object of this invention is to provide a beverage brewer in which all parts are readily interchangable.

Still another object of this invention is to provide a beverage brewer, that is quite versatile, and because of the interchangability of its parts, can be readily field serviced, thereby eliminating the time delaying need for returning of the entire brewer back to the manufacturer.

Another significant object of this invention is to provide a brewer which is of modular design, and therefore can be assembled into a variety of differing types of beverage brewers, thereby minimizing the number of component parts required to be warehoused and inventoried by the manufacturer in preparation for manufacturing and assembling operations.

These and other objects may become more apparent to those skilled in the art upon reviewing the description of the preferred embodiment provided herein, in view of its drawings.

BRIEF DESCRIPTION OF THE DRAWINGS

In referring to the drawings, FIG. 1 provides an isometric view of the custom beverage brewer of this invention;

FIG. 7 is a back view of the brewer with its back panel being removed;

FIG. 8 is a top view of the brewer of FIG. 1, with the top panel removed;

FIG. 9 is a top view of the brewer of FIG. 1, showing also the cover plate for the pour-in port;

FIG. 10 is a plan view of the control panel plate for the brewer;

FIG. 11 is an edge view of the control panel of FIG. 10, showing its internally disposed fasteners for securment by the threaded lock nuts within the interior of the brewer;

FIG. 15 is an underside view of the basket supporting rails beneath the spray head assembly;

FIG. 16 is an exploded view of the spray head assembly;

FIG. 17 is a side and partial sectional view of the spray head;

FIG. 18 is a bottom view of the spray head;

FIG. 19 is a view of the connection between the hot water tube and the tank lid;

FIG. 20 is an isometric view of a modification to the brewer of this invention;

FIG. 21 is a front view thereof;

FIG. 22 is a back view thereof;

FIG. 23 is a bottom view thereof;

FIG. 24 is a partial isometric view of the brewer of FIG. 20, showing its control panel repositioned to a left side thereof;

FIG. 25 is a partial isometric view of the brewer of FIG. 20, showing its control panel repositioned to a right side thereof;

FIG. 26 is a top view of the brewer shown in FIG. 20, disclosing both its warming unit and its pour-in port with lid;

FIG. 27 is a top view of the brewer disclosed in FIG. 20, with its top panel removed;

FIG. 28 is a side view of the control panel plate for the brewer;

FIG. 29 is an edge view disclosing how the control panel secures by fasteners to either the front or sides of the brewer;

FIG. 30 is a back view of the brewer of FIG. 20 with its back panel removed;

FIG. 36 is an isometric view of a further modified custom beverage brewer of this invention;

FIG. 37 is a front view thereof;

FIG. 38 is a back view thereof;

FIG. 55 is a side view of a side panel for the brewer;

FIG. 56 is a top edge view thereof;

FIG. 57 is a back edge view thereof;

FIG. 58 is a bottom edge view thereof, taken along line 58—58 of FIG. 55;

FIG. 59 is a top view of the front panel for a brewer, such as shown in FIG. 54;

FIG. 60 is back or inside view of the front panel shown in FIG. 59;

FIG. 61 is a side edge view of the front panel for the brewer;

FIG. 62 is a back view of a rear side panels support;

FIG. 63 is a top view thereof;

FIG. 64 is a side view thereof, taken along the line 64—64 of FIG. 63;

FIG. 68 is a top view of the interior of the base plate;

FIG. 69 is an end view thereof;

FIG. 70 is a side edge view thereof;

DESCRIPTION OF THE PREFERRED EMBODIMENT

Figure 1:
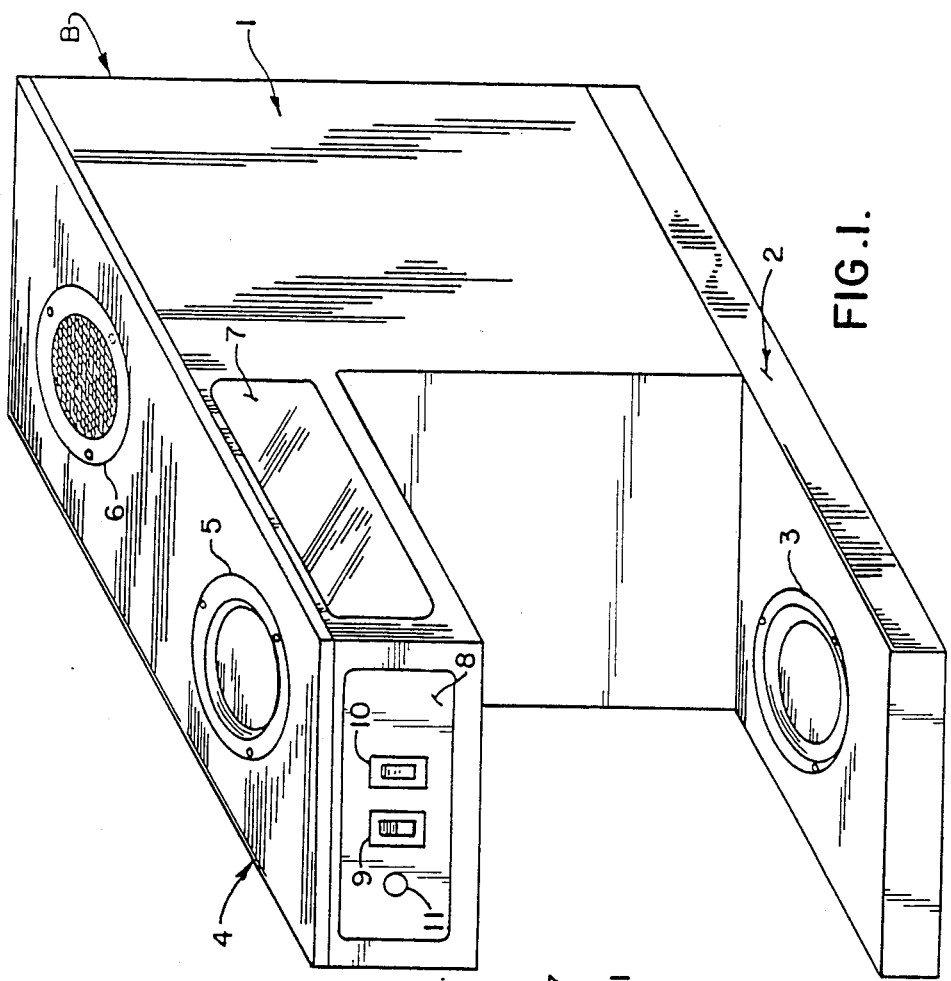

In referring to the drawings, and in particular FIG. 1, the modular formed custom fabricated beverage brewer B of this invention is generally disclosed. The brewer is essentially fabricated of a variety of modular components, but when assembled, generally is configured to form an upright column section, as at 1, and in which the hot water heating tank (not shown) in addition to the electronic controls, are disposed, with said section mounting upon a base member 2, which in one embodiment, as shown, extends forwardly of the brewer and incorporates a warming unit, as at 3, and upon which a decanter or beaker (not shown) may rest, for reception of any beverage being brewed by the maker, and for sustaining the warmth of the brewed beverage, once a brewing cycle has been completed. Located integrally upon the upright column section 1 is an upper cantilevered portion 4, which likewise extends forwardly of the aforesaid section, and generally arranges the brew basket (not shown) at a position where the hot water delivered to it will migrate through its filter, and held grounds, for its dripping into a supported beaker as normally arranged thereunder. As can further be seen, various ports are provided upon the top surface of the cantilevered portion 4, such as another warming unit, as at 5, and a water inlet or intake port 6, through which water may be poured, when the brewer functions in the pour-in mode for brewing of a beverage during application and usage of this apparatus. Also disclosed upon the upper cantilevered portion 4 of the brewer are various closure plates, as at 7, and a control switch panel, as at 8, which is provided for holding the various switches, such as the OFF-ON switch 9, and a brew cycle initiation switch, as at 10, in addition to an illuminating light, as at 11, for indicating when the brewer is maintained in an "ON" condition. Obviously, as will subsequently be defined, various other switches, or controls, valves, or the like, may be exposed upon this panel 8, depending upon the various operations that are built in and can be attained from a fabricated brewer constructed in accordance with the teachings of this invention.

Figure 12:
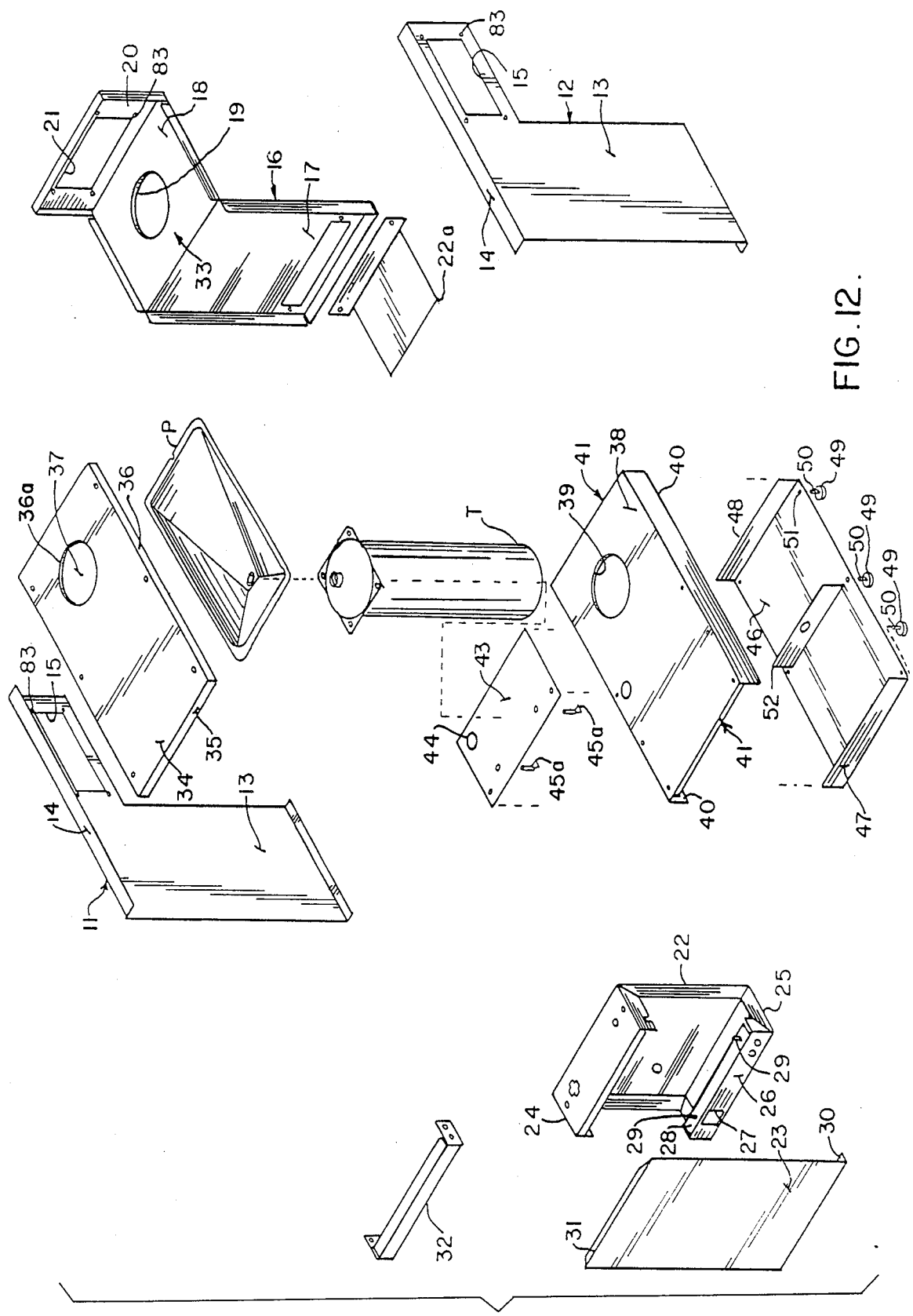
FIG. 12 is an exploded view of the brewer housing, its various walls and arranged plates, and its hot water tank.

To provide a little further insight into the actual fabrication of the brewer of this basic design, and the various components that are fabricated into the structured apparatus, attention is directed to FIG. 12. As can be seen therein, the brewer B incorporates a pair of side walls 11 and 12, having the upright portions 13, and their integral cantilevered segments 14, with each of the side walls incorporating an opening, as at 15, for accommodation of either the location of a control switch panel, as at 8, or a dummy or closure panel, of the type as shown at 7, as explained in the aforementioned FIG. 1. Providing closure for the front end of the apparatus is a shaped but staggered front wall 16 which includes a downwardly extending panel 17, and a forwardly extending an integral panel 18, with said panel 18 having an opening, as at 19, provided therein, and in which the spray head assembly, to be subsequently analyzed, locates during fabrication of the apparatus. An additional and upwardly extending front wall 20 is provided, having an opening, as at 21, provided therethrough, and into which either the control switch panel 8, or the closure panel 7, may be affixed, depending upon whether the brewer of the apparatus is designed for a front end usage, or whether it is designed for a left or a right side application.

Within the back of the brewer B, and arranged intermediately of the side walls 11 and 12 is a rear support panel 22, which is disposed for affixing either to the side walls, or structured to the upper and lower walls of the apparatus, and various electronic and other control instruments and components, usually mount upon this panel, within the assembled apparatus, so as to generally locate all of these controls at one location, meaning that when any problem is encountered, back panel 23 may be easily removed, and the entire support parcel 22 replaced, to facilitate the servicing this brewer. The various controls may mount at select locations upon the rear support panel 22, with the panel incorporating upper and lower flanges 24 and 25, respectively, to furnish supporting surfaces where the components may be installed, and to further add to the reinforcement of this panel. In addition, the lower flange 25 includes an upright portion 26, which may include a further opening, as at 27, provided therethrough, and to which an electrical outlet may be installed, to provide further service for the brewer, and to which other electrical cables may connect, to attain a source of electrical energy for other applications. A further inturned flange 28 is provided, having a series of pins, as at 29, extending upwardly therefrom, and which provides a form of supporting surface, and locking means, for engagement through the lower flange 30 of the back panel 23, to support it during its installation. An upper integral flange 31 is provided for reinforcement of the back panel, at this location, and to generally rigidify the assembly at this position.

As an alternative to the rear support panel 22, and for use when the tank in the brewer is of the shorter and greater diameter type, thereby eliminating the space for the panel 22, a horizontal drawer type support 22a may be employed, and fit under the tank, in a horizontal position, by sliding through an opening in the front wall 17, and having its front plate being affixed thereto. All of the same controls may mount upon the drawer 22a, and provide an easy assembly for their collective installation or removal.

A transverse support 32 is disposed for spanning the spacing between the upper back corners of the side walls 11 and 12, to rigidify the brewer at this location. And, the upper flange 31 of the back panel 23 is designed for resting upon the upper surface of the transverse support 32, when assembled into closure.

With the locating of the side walls 11 and 12 into position, held by means of the front wall 16, the transverse support 32, the rear support panel 22, and the back panel 23, the general frame work of the brewer can be determined, and which forms the aforesaid upright column section 1, into which the water heating tank T, and its controls, locate, and are held into position during brewer assembly. Generally, the tank will be affixed into position by having its frontal edge braced upon the upward surface, proximate the location 33, of the front wall 16, where noted Upon the water heating tank T there is disposed a pan P, which is designed for receiving any water that may be either poured into the brewer in initiation of a brewing cycle, or which may be automatically delivered from a cold water inlet supply, through the operations of timer means and interconnected valve, for delivery of a select quantity of water to the pan, and consequently to its water heating tank T, during functioning of a brewing cycle. A top wall 34 is provided, having a series of downwardly depending front and rear flanges 35, and side flanges 36, for overlying the top edges of the side walls, the front wall, and the back panel 23, after the brewer has been assembled. The top wall may include one or more openings therethrough, as at 36a, and which may contain either a warming unit, of the type as previously described at 5, or, as shown, may include a filtered or screened intake port, as at 37, and through which water may be poured when the brewer is functioning in the category of a pour-in cycle of beverage brewing operation. These warming units, and intake ports, have already been described with respect to the components 5 and 6, as previously explained with respect to the assembled unit as shown in FIG. 1.

The base member 2 for the brewer is fabricated from an upper support or base 38, having an opening, as at 39, provided therethrough, and into which a warming unit, such as that identified at 3, may locate during brewer assembly. The support 38 includes depending side flanges 40, and inwardly bent flanges 41, all of which add rigidity to the upper support during its installation. A pair of pins, as at 187, extend upwardly from the approximate back edge of the support 38, and upon said pins the flange 25 of the rear support panel 22 locates. Also upon the base 38 locates an insulating plate 43, as noted, to provide further structural support and confinement of that upright column section in which the water heating tank T locates. There may be an aperture, as at 44, provided through the plate 43 and through which the various electrical cables may insert, and in addition, there are the pair of apertures, as at 45, and through which additional pins 45a locate, when positioning of the plate 43 into its operative location. To rigidify the base member 2, a lower plate 46 is provided, having front and rear upstanding integral flanges 47 and 48, and which when mated with the upper support plate 38, within its bent in flanges 41, provides an enclosed structure of significant rigidity so as to provide full and stable support for any brewer assembled thereon While a variety of methods may be used for assembling the upper support 38 and the lower plate 46 into closure, in the preferred embodiment, a series of mounts, shaped in the form of rubber pads 49, having upstanding threaded fasteners 50, locate through the apertures 51, and threadedly engage with retainer nuts (not shown) aligned with and welded to the underside of the upper support 38, so that by turning of the mounts 49, they will threadedly screw and fasten these two components rigidly together, to form the structured base 2.

The base member 2 may be fabricated into various spacings, in order to compartmentalize the base, and this may be achieved through the addition of a transverse plate 52, so as to separate the heat as generated in the forward segment of the base member by means of the warming unit 3, from any cables or conductors that may locate in or proximate the rearward segment of the said formed base member.

With the aforesaid general description of the structural components that are fabricated into the housing for this brewer, select components, and their arrangement for attaining particular results, within the assembled brewer, can be more completely understood.

Figure 2:
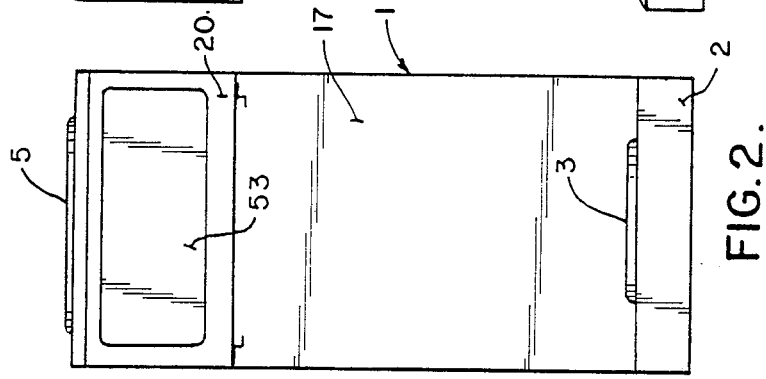
FIG. 2 is a front view thereof.

As can be seen in FIG. 2, which is a front view of the brewer, the control switch panel 8 may be replaced with a closure plate, such as the plate 53, equivalent to the plate 7, where the brewer is to be converted from a front operating brewer, as shown in FIG. 1, to a side functioning type. As also noted herein, various rails, as at 54 and 55, are provided for accommodating the sliding insertion of the brew basket (not shown), when it is located into position for performance of a brewing cycle. Obviously, when the brewer of this invention is being converted into a side type installation, and that is where the brew basket may be slid in either from the left or right hand side, then these rails 54 and 55 may be converted from a front to back disposition, as shown in FIG. 2, to a side-to-side configuration. This will be subsequently analyzed.

Figure 3:
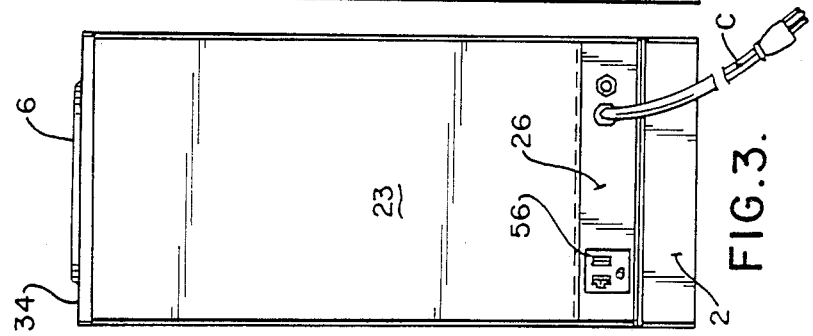
FIG. 3 is a back view thereof.

FIG. 3 provides a back view of the brewer assembly. It includes its top wall 34, the back panel 23, the lower support flange 26 of the apparatus, in addition to its base member 2. As previously commented, an electrical receptacle, as at 56, may be provided through the lower support panel 26, or its upstanding flange, and the main electrical cable, as at C, may insert therethrough to conduct electrical energy to the various operating components, controls, and electrical instrumentations, contained therein, and supported by that rear support panel as previously analyzed, that locates behind the rear panel 23, as aforesaid.

Figure 4:
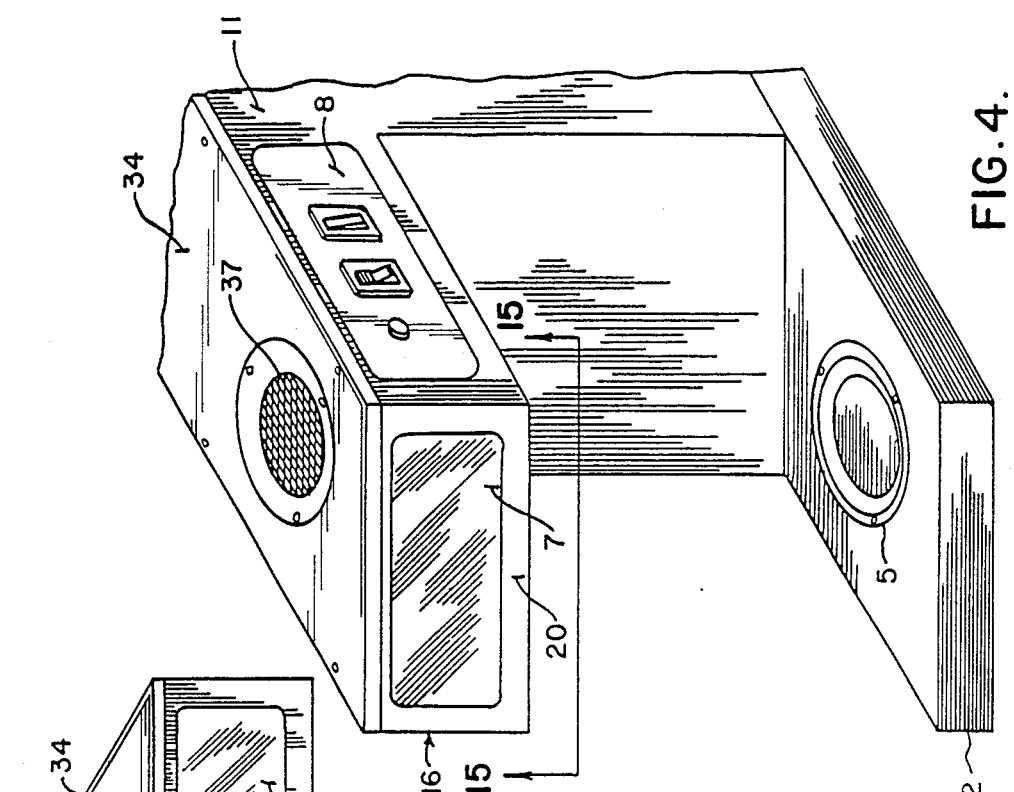
FIG. 4 is a partial view of the brewer as disclosed in FIG. 1, with the operating control panel being changed from the front to a right side mount.
Figure 5:
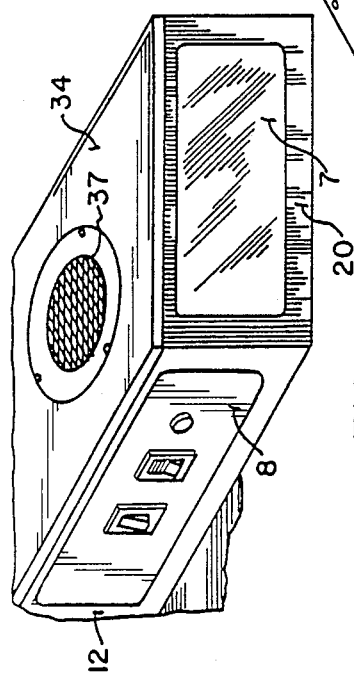
FIG. 5 is a similar view of the top of the brewer as shown in FIG. 4, with the control panel being located upon a left side surface.

FIGS. 4 and 5 disclose how the brewer of this assembly may be converted from a front operating brewer, to the side functioning type. For example, as can be seen in FIG. 4, the control switch panel 8 has been relocated to an affixed within the left side wall 11. As a result, the closure plate 7 is now installed upon the upstanding wall 20 of the front wall 16. In addition, in this particular instance, it can be seen that the pour-in style of water intake port 37 locates proximate the frontal segment of the top wall 34.

In the alternative, the brewer may be fabricated to function as a right side assembly, having the control switch panel 8 located within the right side wall 12 of the apparatus. In addition, the closure plate 7 will continue to close off the opening 21 provided through the upstanding front wall 20. As a further alternative, one of the warming units, such as 5, may be located at the front segment of the top wall 34, in lieu of the water intake port 37, as previously explained. This indicates the ease at which the various modular components that make up the brewer of this invention can be shifted in their installation within the brewer of this invention, either during its fabrication, or subsequent thereto, in order to accommodate and facilitate the usage and application of the brewer by its owner.

Figure 6:
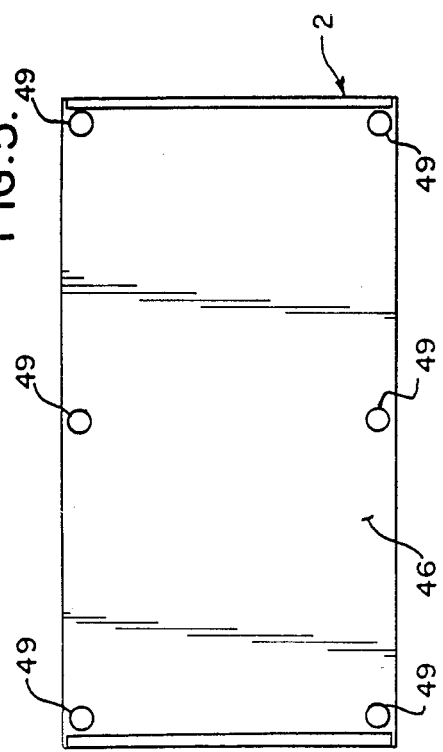
FIG. 6 is a bottom view of the brewer of FIG. 1.

FIG. 6 discloses a bottom view of the assembled brewer disclosed in FIGS. 1 and 4. This corresponds to the lower plate 46 incorporating the series of mounts 49 that threadedly engage the base member 2 into its fabricated configuration.

FIG. 7 provides a back view of the apparatus with its back panel 23 removed. As can be seen, the incoming electrical cable C, with its standard plug in receptacle is shown. In addition, the electrical receptacle 56 is also noted, and also obtains its electrical energy from the cable C. An intake water line is available through the rear support panel 25, by means of the fitting 50. Any water taken herein is passed through a water strainer 51, passes through the water flow line 52, to a junction 53. At the junction a further flow line 54 passes the water through a electrically controlled or solenoid operated valve 55, for passage of the water through a flow line 56, and 57, after its passage through the compound fitting 58, that extends through the upper flange 24 of the rear support panel. The flow line 57 empties the water into the pan P for eventual drainage into the water heating tank T during a brewing cycle. This particular type of water intake means, generally is employed in the automatic cold water inlet supply type of delivery of water to the water heating tank T, through the automatic and timed operations of this device. In addition to the foregoing, water at the junction 53 may pass through a manual valve 59, which, when opened, allows water to flow through the flow line 60 and to the junction 61, where the water may be delivered, as a cold water supply, to any type of faucet that may be either permanently affixed to a control switch panel 8, as previously explained, or perhaps be delivered to a flexible conduit line, attaching with a more portable faucet (not shown) for delivery and usage of water at some remote location. Or, this water may be delivered to a supplemental heater, as a coil arranged within the hot water tank, as will be subsequently described.

Electrical instrumentalities are further included within this rear support panel, and include electrical cable extending from the cable C to the receptacle 56, with additional electrical lines 62 extending upwardly to an electrical connector, as at 63, where further electrical lines may extend downwardly, as at 64, to a switch control, as at 65, which further conducts charge by way of the electrical line 66 for the timed operations of a solenoid, or other instrument, associated with the electrical control 67, that operates the valve 55. Further electrical connection, by way of the lines 68 extend to the electrical controls 69 that furnish operations for the heater, the thermostat, and related electrical controls normally used within a beverage brewer of this type. These are the type of electrical and related mechanical controls used in conjunction with this style of coffee brewer, and whether it be of the pour-in type, that initiates a brewing cycle, or of the automatic cold water inlet supply type, that functions from the operations of a timer. Many of these controls are standard in the art.

FIG. 8 discloses a top view of the brewer, with its top wall 34 removed, so as to disclose the shape of the water inlet pan P therein, and its drain opening 70 that allows for the water to flow into the water heating tank T, as previously explained. It is to be noted that the drain opening 70 is held by means of a fastening nut 71, onto a length of pipe or nipple (not shown) that displaces the pan P upwardly and spacedly from the top 72 of the water heating tank T, and its cover plate. A simple removal of the retaining nut 71 allows for the pan to be lifted upwardly, and removed. Likewise, the water flow line 57 connects to a fitting, as at 72 provided through the back end of the said pan and deposits cold water directly into the pan, during a predetermined and select period of time, during usage of this brewer in the automatic mode. A shield 73 prevents splashing of the cold water as it exits from the fitting 72, and is delivered into the pan P.

The top wall 34 of the brewer is also disclosed in FIG. 9, showing where its various apertures 74 are located, through which fasteners are applied for securement of the top wall into position, and confinement of the various upper segments of the brewer into fixed condition, principally through the embracement by the various flanges 35 and 36 of the top wall, when located into a top closure position upon the side, front, and back walls or panels of the device. And, as can be further seen, where a pour-in port 37 is provided through the top wall, as can be noted, it may be desirable to include a cover 75 for the opening, which cover may include a handle means 76 and be confined by means of the linkage, such as the chain 77, as noted, so as to prevent its untimely loss or misplacement.

The configuration of the control switch panel 8 is more accurately shown in FIGS. 10 and 11. This plate includes the plate means 78 as shown, having a variety of apertures 79 through 81 provided therethrough, and for accommodating the mounting of the various switches and lights, 9 through 11, as previously explained. In addition, proximate each corner of the plate 78 is a rearwardly extending integral fastener, as at 82, and these fasteners are arranged for insertion through corresponding apertures, as provided at 83, through the various side walls 11 and 12 and the upstanding front wall 20, depending upon just where it is desired to locate the control switch panel within the brewing apparatus. Once the panel is located into position, the fasteners 84 may threadedly engage upon their respective screws 82, internally of the identified walls. The blank or closure plates 7 are constructed similarly, but without the mounted switches, as can be noted.

Figure 13:
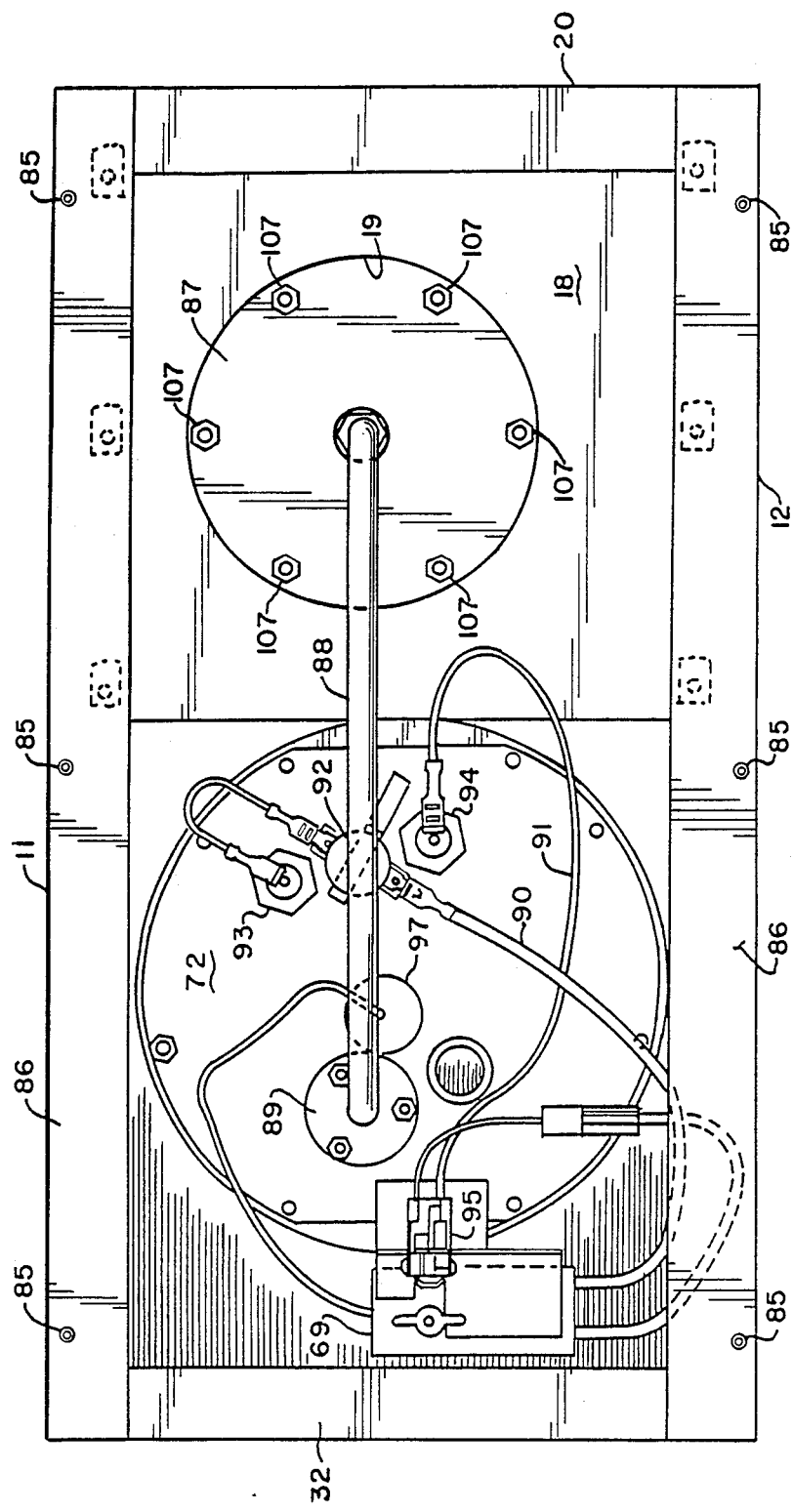
FIG. 13 is top view of the brewer with its pour-in basin removed.

The arrangement of the various components within the brewer of this invention can be more accurately seen, in their top view, as in FIG. 13. The top of the upstanding front surface 20 is disclosed, as is the top of the transverse support 32, provided proximate the rear panel of the invention. The upper segments of the various side walls 11 and 12, respectively, are shown. It is to be noted that there are various flanges provided around the perimeter of the top of the housing, when assembled, and these particular flanges will be described subsequently in greater detail Nevertheless, it can be seen that there are various apertures, as at 85, provided through the side wall flanges 86, and which accommodate threaded fasteners useful for holding the top wall 34 into position, when enclosed thereon. The forwardly extending portion 18 of the front wall does have its aperture 19 provided therethrough, and it accommodates into position the spray head assembly 87 of this invention. The sprayhead assembly is designed to receive the flow of heated water through its flow line 88, generally through a siphoning principle, which flow line 88 connects with the top plate 72 by means of the coupler 89 of the water heating tank T. The mounting of the electrical thermostat 69 is also disclosed attaching with the cover plate 72. Various electrical connections are made by way of the electrical lines 90 and 91, with the connection 90 being secured with the limit thermostat 92, and the heating element being connected at 93 and 94, and which heating is regulated by the mounted thermostat 97.

It can be seen that these various electrical controls, and their wires 90 and 91, are connected, as at 95. During operations of this particular brewer, when water either flows into the water heating tank by means of the pour-in deposit through the intake port 37, or when the water is automatically flowed into the pan P by means of the timed release of water from the fitting 72, the water flows into the bottom of the tank T, as is customarily done in beverage brewers long available upon the market, and with the hot water rising to the top of the tank and being forced by the incoming cold water to flow through the flow line 88, into the spray head held by the assembly 87, for discharge onto the grounds contained within any brew basket supported by and underneath of the forwardly extending wall 18 of the staggered front wall assembly.

Figure 14:
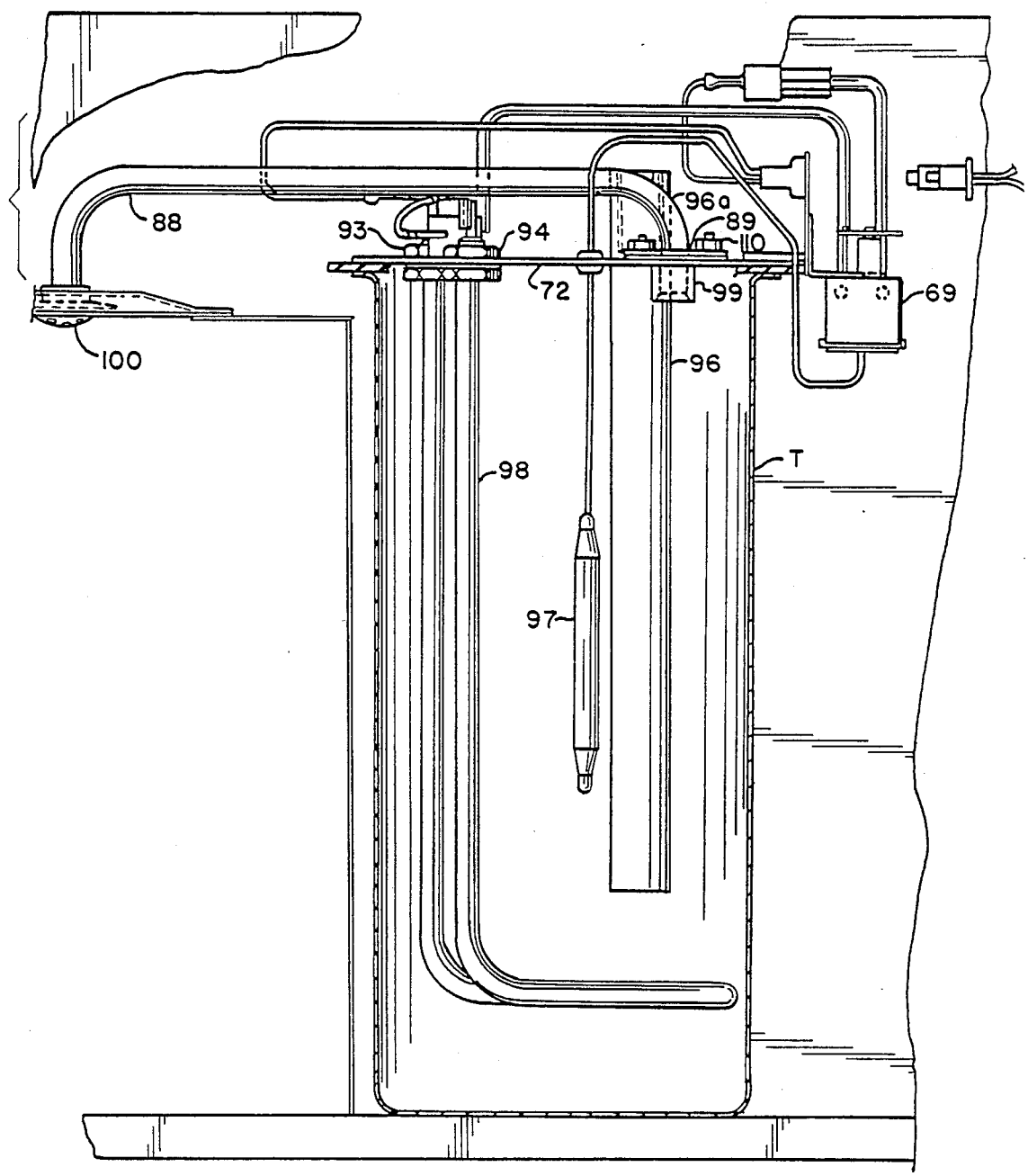
FIG. 14 is an internal view of the water heating tank showing the various heaters and controls in addition to the water flow lines connecting therewith.

FIG. 14 shows the details of the various components as previously identified, and which includes the intake duct 96 arranged within the hot water tank T, having a thermostat 97 arranged in proximity therewith, and the heating element 98 connecting by way of the electrical connectors 93 and 94 as previously explained. As earlier commented, the bottom of the intake duct 96 opens proximate the lower segment or bottom of the tank T, so that cold water will be deposited into the bottom of the tank, forcing the heated hot water arranged thereabove, to flow out of the fitting 99 and through the flow line 88, for dispensing from the spray head 100, of the assembly 87, as previously noted.

Also, it should be noted that a nipple 96a extends upwardly from the plate 72 communicating with the duct 96, and it is upon this nipple that the pan P secures at the location of its drain opening 70 and secured by the nut 71 for direct delivery of incoming water to the hot water tank.

The spray head 100 is more accurately shown in FIGS. 15 through 18, which includes the spray head being assembly threadedly engaged to the threaded end 101 of the water tube 88. A combination of washer 102 and nut 103 are provided for accommodation on the end 101, in order to assure a water tight seal and firm connection of the spray head within the spray head assembly 87. The spray head assembly includes a bracket 105 which is secured by means of a gasket 106 arranged around the perimeter of the opening 19 provided through the forwardly extending front plate 18. A series of fasteners, as at 107 (see FIG. 12) are provided for tight securement of the spray head assembly 104 into place. It can be seen that there are series of spray apertures, as at 107a, provided through the spray head 100.

The connection between the hot water tube 88 through the top plate 72 is achieved through the junction of a polymer fitting, as at 108 that threads or otherwise engages onto the inward end 109 that extends through the top plate 72. The connecting member 89, secured by means of the fasteners 110 secure these components together. See also FIGS. 13 and 14.

The location of the brew basket rails mounted to the underside of the forwardly extending portion 18 of the front wall 16 is shown in FIG. 15. These rails, as can be seen at 54 and 55, each include a base portion 111, which is held by fasteners 112 to the underside of the surface 18. To accommodate the convenience of the insertion of the rails into position, each of the base portions 111 have an enlarged opening, as at 113, into which the head of the fastener 112 generally at the front initially insert through, and then slide into a locking position within the more constricted portion of the opening 113. Then, simultaneously, the back end of the rails incorporate and opened slot, as at 114, for embracing the fasteners 112 located at the back end of the said rails. Finally, the intermediate fasteners 112 are then firmly tightened into position, for locking the rails into their fixed and operative locations. Each rail includes a downwardly extending flanged portion, as at 115, to provide clearance for the sliding insertion of the contiguous brew basket (not shown) as is well known in the art, for holding the basket of filter supported coffee, or other, grounds into position for reception of the hot water received from the spray head 100, during the performance of a brewing cycle. But, what is unique about this current invention, is that when the rails are maintained in the position as shown in FIG. 15, the brewer is a front disposed and operative apparatus. But, where it is desired to utilize the brewer as either a left side or right side disposed apparatus, then these rails may be freed and turned approximately ninety degrees, so as to dispose their open ends, as at 116, either into a left side, or the right side clearance, of the brewer, to allow for the sliding insertion of the brew basket from either of those lateral locations. This is simply accomplished through the removal of the intermediate fasteners 112, and a loosening of the end fasteners 112 located at either end of the respective rails. The rails are then slidingly removed, rotated approximately ninety degrees, to locate one rail at the back edge of the surface 18, and the other rail proximate the front of the said surface. Hence, it can be seen that the fasteners 112 located at each corner of the surface 18 need not be removed, but only loosened to allow the rails to be turned about their apertures 113 and their slots 114 upon the corner fasteners 112, and when that is achieved, then the intermediate fasteners 112 can be fixed into a tightened position within the threaded apertures 117 to provide for that lateral usage of the brewing apparatus.

Variations in the structure of the brewing assembly of this invention is shown in FIGS. 20 through 22. In this particular instance, the brewer incorporates the usual housing configuration as previously explained, having its base 2 supporting the upright column means 1 and its forwardly cantilevered portion 4. In this particular instance, though, it can be seen that an auxiliary water faucet is provided at 118, mounted onto the surface of a control switch panel 8, and can be used for dispensing either tap water delivered through the flow line 60, and out of its junction 61 (See FIG. 7), or as will be subsequently described, additional heated water may be dispensed from the faucet 118, delivered from a supplemental hot water source operatively associated within the water heating tank T, as will be later defined.

In addition, it can be seen that a further housing 119 is provided upon the upper and back surface of the top wall 34, and it includes a warming unit 120, heated by an electrical source, controlled by one of the switches 121 in order to provide an elevated position for locating of an additional decanter or beaker of brewed beverage, or water for that matter. The remaining components of the beverage brewer are related to that which has already been previously described herein. This housing may be fabricated having the usual walls held together by their fastened end flanges (not shown), with a top wall mounted thereon. In addition, the warmer can have its control switches changed to various locations, or the housing itself can be rotated ninety or one hundred eighty degrees, to dispose the controls to the front or sides for the convenience of its usage.

FIG. 23 discloses, once again, a bottom view of the brewer, of the type as shown in FIG. 20.

FIGS. 24 and 25 disclose a similar type of beverage brewer as shown in FIG. 20, with the exception, in this instance, that the control switch panel 8 has been moved from the front wall to the cantilevered portion of the right side wall 14. In addition, in FIG. 25, the control switch panel 8 has been shifted from either the right or front walls to the left side wall 11, so as to convert the brewer into a left side loading and operative apparatus.

FIG. 26 shows a top view of the brewer shown in FIG. 20, disclosing its various defined components.

FIG. 27 shows the same brewer with the top wall removed, to disclose its various operative components therein, including the pan P and the incoming water line 122 that delivers water automatically when the brewer is operating in the automatic supply mode. This method for delivery is distinct from the structures shown and explained in FIG. 8. In addition, water can simply be poured into the pan P, through the intake port 123 as noted. The various other controls operate quite similarly to those which have been previously described.

FIGS. 28 and 29 show the control switch panel 124, containing the various apertures, as at 125 and 126 therein, and further including an additional aperture, as at 127, which may contain a further electrical switch, as for example, for effecting operations of the warming unit 120, mounted upon the supplemental housing 119. The fastening of the panel 124 through the agency of its threaded screws 128 and the attachment of its fasteners 129, has already previously been analyzed.

Figure 31:
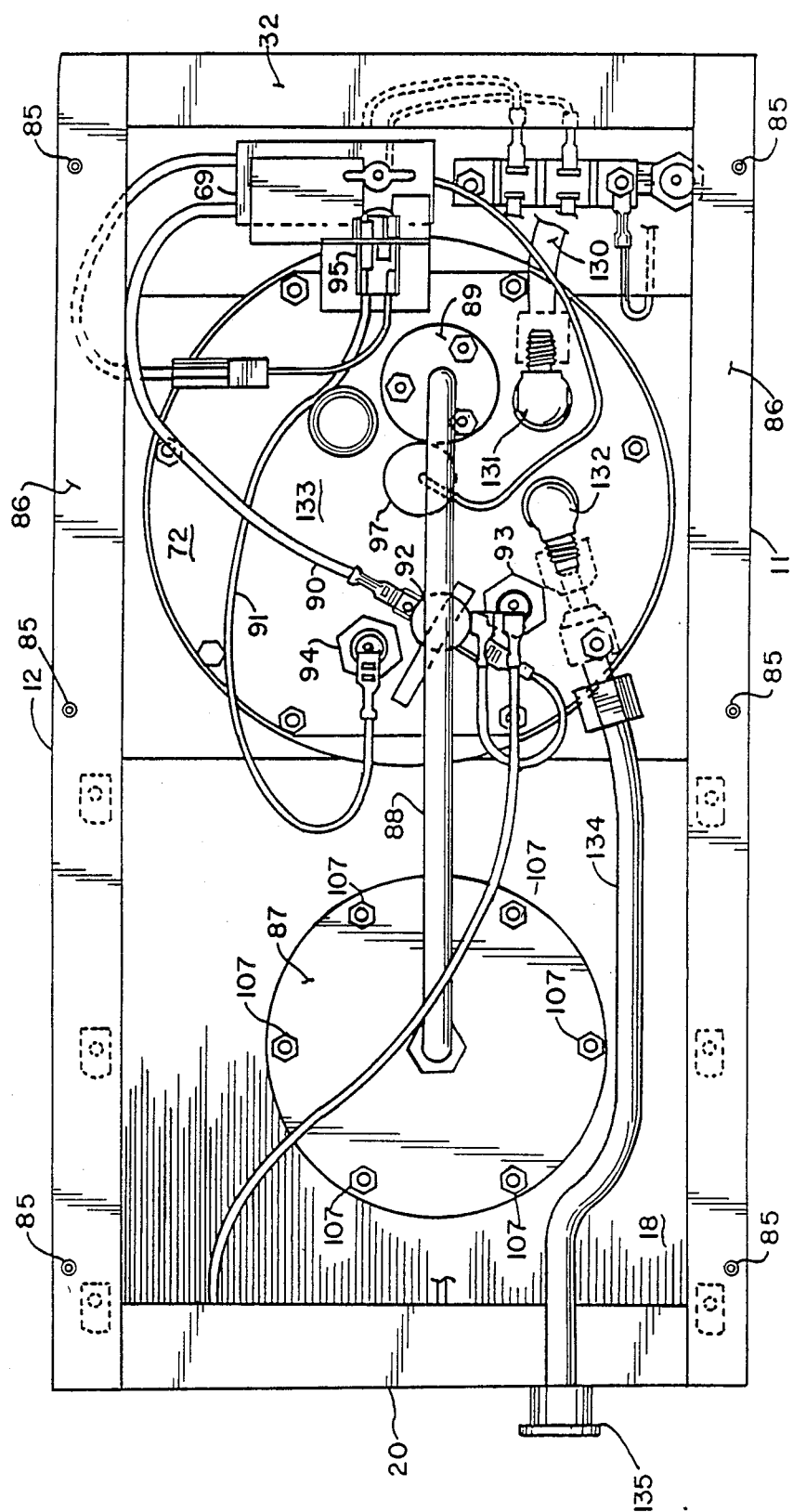
FIG. 31 is a top view of the brewer of FIG. 20 with its pour-in basin and top panel removed.

FIG. 30 shows a view of the back side of the unit as shown in FIG. 20, with the back wall removed, and similar to that already explained in FIG. 7, but in this particular instance it is to be noted that the cold water inlet water line extends further upwardly, as at 130, and enters into the water heating tank T through its connection 131. This can also be seen in FIG. 31, and it can also be noted that a further junction 132 extends out of the cover 133 of the water heating tank, and connects with a flexible water tube 134 for securement with the water faucet, partially shown at 135. This is the same water faucet as previously defined with respect to FIGS. 23 and 24, which in this particular instance, delivers heated water to the faucet 135, for delivery of supplemental heated water for additional application and usage.

The remaining components as shown herein are similar to those which have already been described with respect to FIG. 13.

Figure 32:
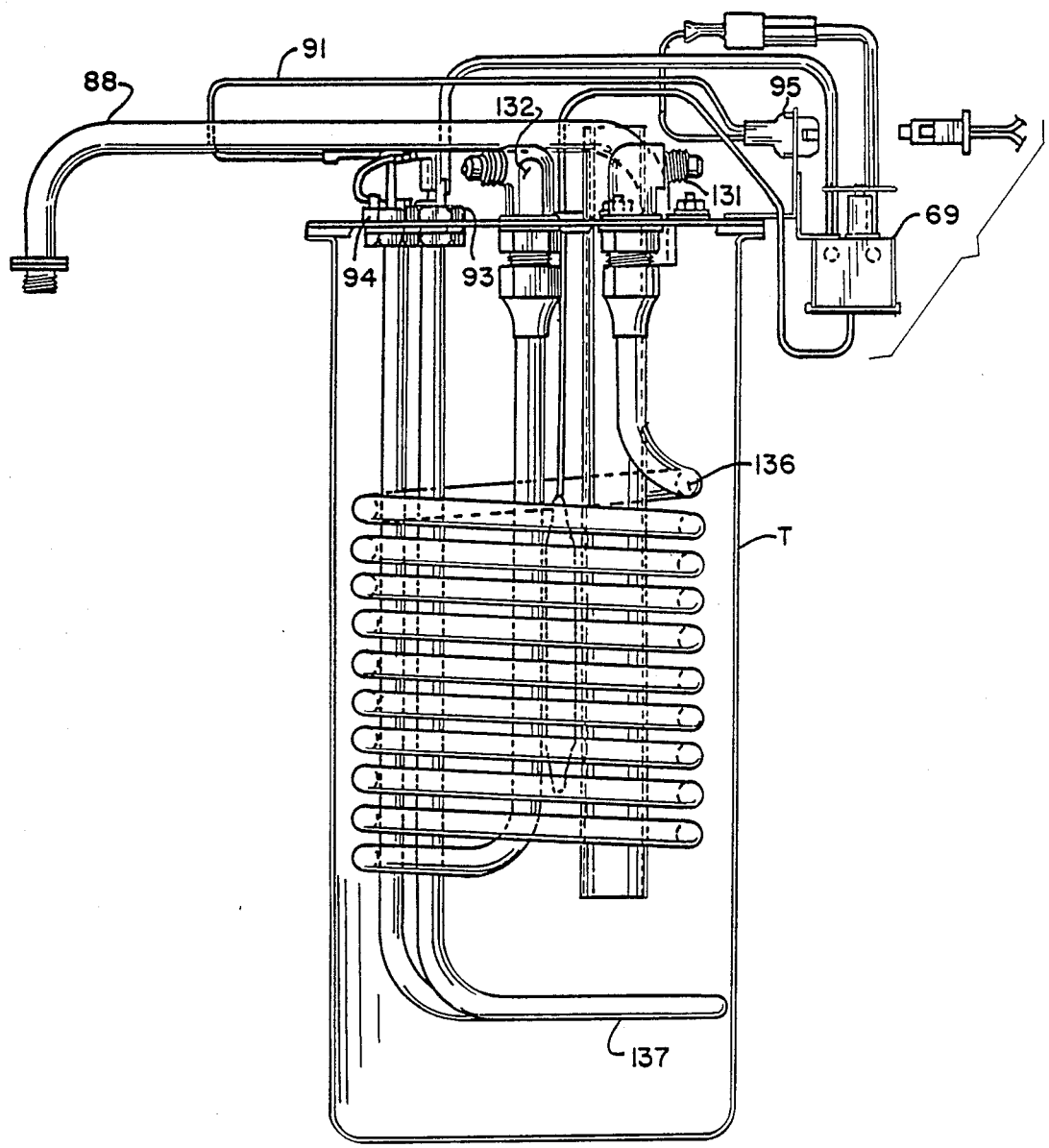
FIG. 32 is a sectional side view of the hot water tank disclosing its various controls for the brewer disclosed in FIG. 20.

FIG. 32 shows the relationship between the incoming auxiliary water line 130, connecting to the junction 131, and the outlet junction 132. As can be seen, heater means, in the fashion of a coiled heater, as at 136, is disposed within the hot water tank T, and this coiled heater provides for the flow of the segregated water through the heater water within the tank T, and which is heated by the heater means 137 located therein, as earlier explained, through the agency of the heat delivered by said heater, in addition to the hot water generated within the water heating tank T, during its functioning. Thus, the coil contained water also gets heated before delivery to the faucet. Once again, the remaining components disclosed herein are similar to those which have already been previously described.

Figure 33:
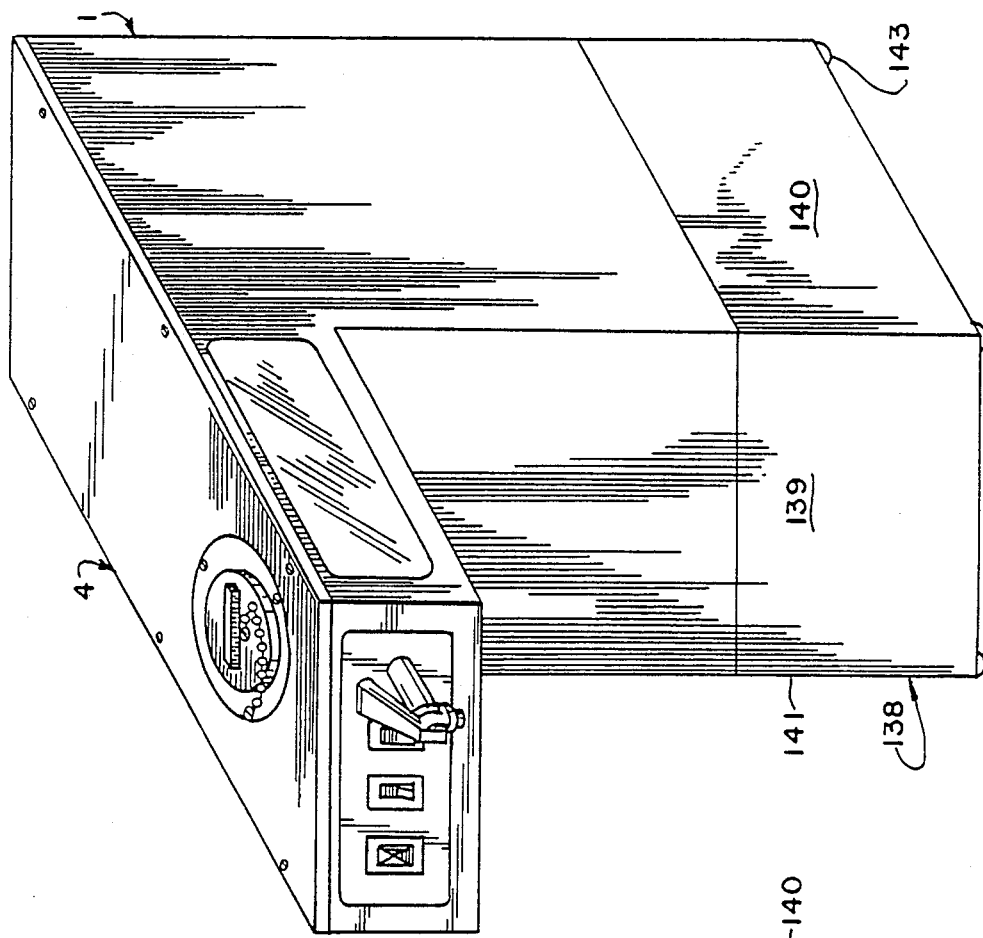
FIG. 33 discloses an isometric view of a modification to the custom beverage brewer of this invention.
Figure 34:
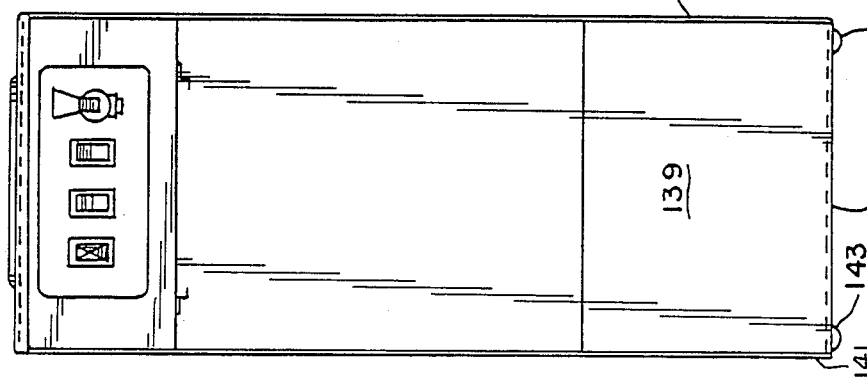
FIG. 34 is a front view thereof.
Figure 35:
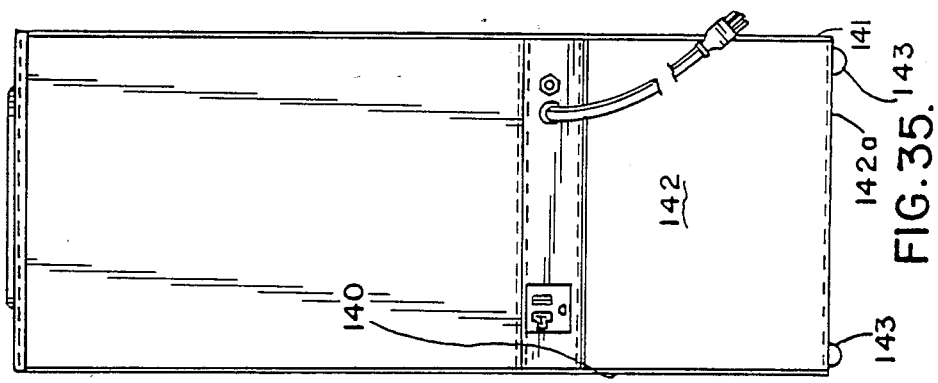
FIG. 35 is a back view thereof.

FIGS. 33 through 35 disclose a variation upon the modular formed beverage brewer of this invention. In this particular instance, the various components formed into the upper cantilevered portion 4, and the upright column means 1, are fairly identical to those structures fabricated into the brewer of this invention, as already previously explained. In this particular instance, though, the base member 2 has been removed, from the style of brewer as shown in FIG. 1, and has been replaced by a column extension 138. This extension is fabricated from structural components, usually shaped metal fabrications, that are secured together to form a front wall 139, side walls 140 and 141, and a back wall 142. These walls may include integral flanges (not shown) to facilitate the connecting of the walls into the housing form. Similar flanges may be provided at upper and lower positions of these walls to aid in the connection of the extension to the bottom of the column means, and to provide means for securement of any mounting means thereto. In addition, mounting means, 143, of the type as previously explained in FIG. 12, threadedly engage through the bottom wall 142a of the extension, in order to aid in the securement of this column extension into a fabricated unit. The advantages for this style of replacement for the base means 2, or the addition of this modular type of column extension means 138 to the bottom of the upright column means 1, should be rather apparent. It extends the height of the cantilevered section 4, and for that matter, the height of the entire housing, so that the brewer can now be used for directly brewing a greater quantity of coffee, tea, or the like, and deposit it right into an air pot, enlarged tea decanter, or a similar type of beverage holder that is of the type having significant height, beyond that of the standard size beaker normally used for holding brewed coffee, as when used in conjunction with the standard coffee making apparatus.

FIGS. 36 through 38 show a further variation upon the modularized brewer of this invention. Generally, the brewer as shown in FIG. 36 is essentially that which has already been explained with respect to FIG. 33, but in this particular instance, its column extension 138 has its mounting means or pads 143 removed, and they are replaced through the threaded engagement of extension legs 144 to the bottom of the member 138. Thus, the height of the brewer is extended even further, and in this particular instance, as can be seen in FIG. 37, one of the beverage containers, such as an air pot, or enlarged tea decanter, as generally shown at phantom line at 145, can fit directly under the brew basket 146 and have an ample quantity of tea, or other beverage, drip processed directly into it for brewing a rather large quantity of such beverage. This example, as explained with respect to these figures, provides a ready indication as to just how the brewer of this invention is modular formed, can be quickly converted to a brewer for use in conjunction with other sized beverage containers, but yet continue to utilize the same operative and electronic components therein, for initially heating the water within its hot water tank, and distribute the same to the brewing basket, such as shown at 146, for delivery of a brewed beverage directly to a container or decanter of a variety of shapes or sizes. Thus, all it takes is a quick replacement of one component, in this particular instance, simply the mounting pads 143, as previously explained, and replacing them with the legs 144, for significantly elevating the brewer, and its basket 146, to provide for a ready accommodation of a decanter having significant height.

Figure 39:
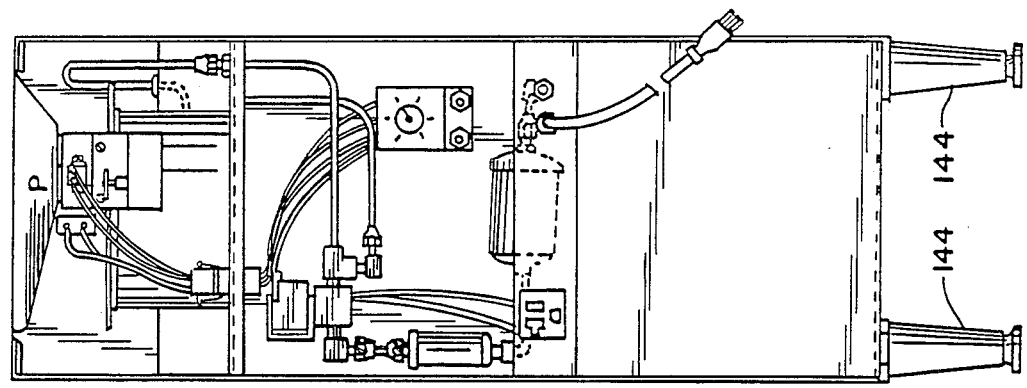
FIG. 39 is a further back view of the modified brewer of this invention, as shown in FIG. 38, with its back panel removed.
Figure 40:
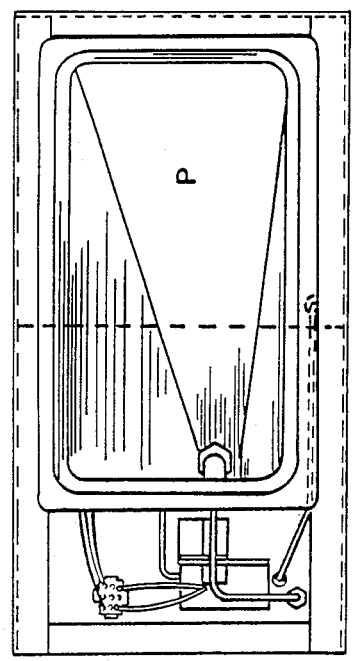
FIG. 40 is a top view of the brewer disclosed in FIG. 33, with its top panel removed.

The FIGS. 39 through 43 disclose how the custom beverage brewer shown in FIG. 36 is fabricated, disclosing it in various views, with the disclosure shown in FIG. 39 providing a back view, with the back wall removed, and disclosing just how the same electronic and mechanical controls, as previously explained, function to operate the brewer, for preparing a beverage either by the pour-in cycle of operation, of through the automatic cold water inlet supply method used in conjunction with brewers of this type. FIG. 40 shows a top view of the brewer, with its top panel removed.

Figure 43:
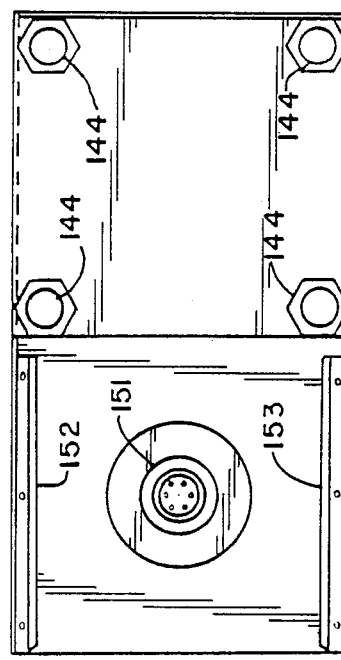
FIG. 43 is a bottom view of the brewer of FIG. 33.
Figure 42:
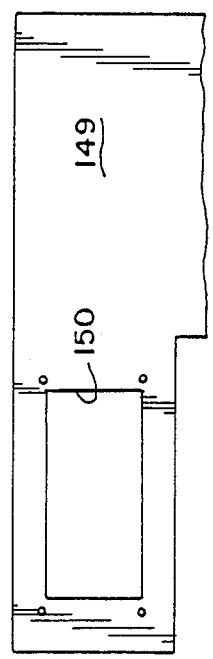
FIG. 42 is a partial right side view of the brewer of FIG. 33 with its control panel removed.
Figure 41:
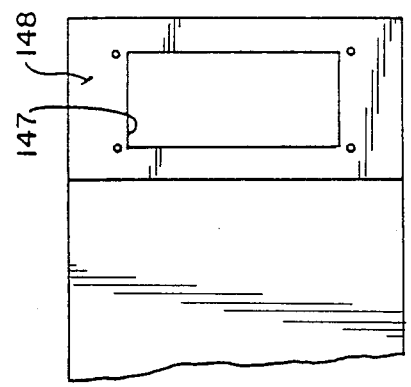
FIG. 41 is a partial front view of the brewer shown in FIG. 33, with its control panel removed.
Figure 48:
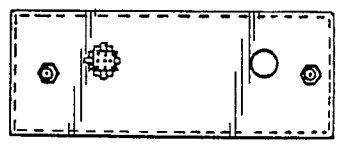
FIG. 48 is a top view of the control panel as shown in FIG. 44.
Figure 45:
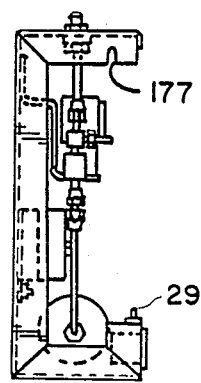
FIG. 45 is a left edge view of the control panel of FIG. 44.
Figure 44:
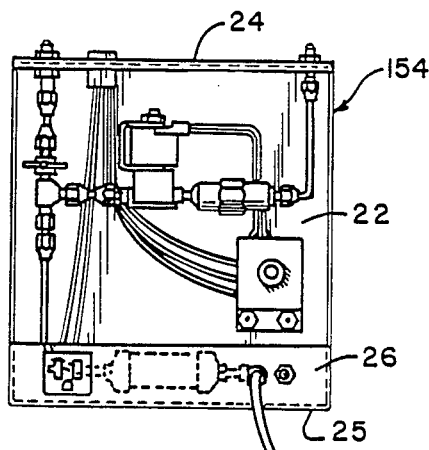
FIG. 44 is a back view of the intermediate modular control panel that fastens within the back of the custom beverage brewers as shown in FIG. 1, 20, 33, and 36.
Figure 46:
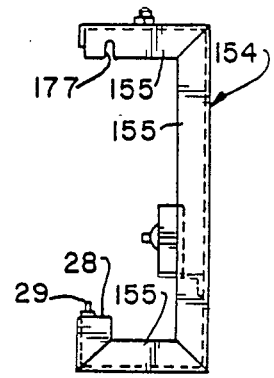
FIG. 46 is a right edge view of the control panel shown in FIG. 44.
Figure 47:
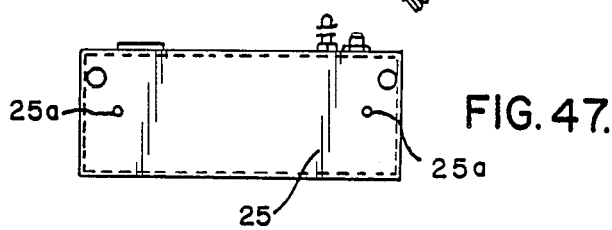
FIG. 47 is a bottom view of the control panel shown in FIG. 44.
Figure 50:
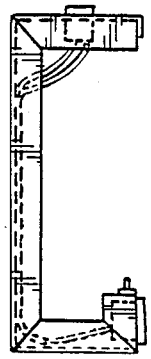
FIG. 50 is a left edge view thereof.
Figure 49:
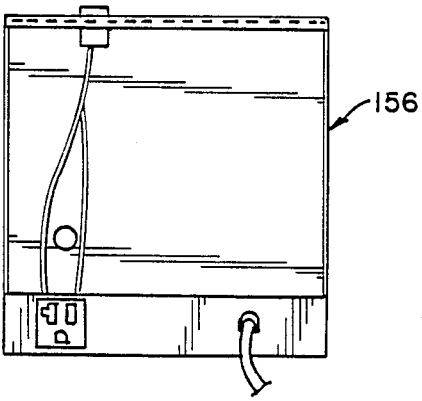
FIG. 49 is a front view of a modified control panel for the identified brewers.
Figure 51:
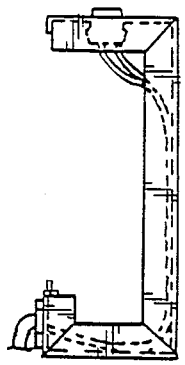
FIG. 51 is a right edge view thereof.

FIG. 41 provides a partial front view of the brewer, and showing the opening 147 within the upright front wall 148, and where the control switch panel, such as that as previously explained at 8, may be installed. FIG. 42 shows a similar type structure with respect to the side wall 149, disclosing the opening 150 where a control switch panel may be mounted, so as to provide for a side disposed operative beverage brewer, of the type as previously explained. The advantages for this have already been explained, but generally herein disclose the facility with which the brewer of this invention may be quickly modified to provide either a front or side brewer operative apparatus, and one that can be extended heightwise, as shown in FIGS. 33 and 36, to accommodate a larger sized or a decanter of greater height. FIG. 43 provides a bottom view of the embodiment shown in FIG. 36. In this particular instance, the spray head assembly 151 is noted, and the rails 152 and 153 are shown, in this particular instance, providing for a front loading of the brewing basket 146. In the alternative, and as previously explained with respect to FIG. 15, these rails may be arranged transversly, so as to provide for the side loading type of brewer, when used in conjunction with a brewer having its control switch panel arranged along one of the sides, such as explained with respect to the embodiment shown in FIG. 42.

FIGS. 44 through 47 disclose how the rear support panel 154 is totally removable from the brewer assembly. This has already been briefly explained with respect to the panel 22 previously described as shown in FIG. 12, but in this particular instance, the rear support panel is disclosed holding its various electrical cables, and controls, as previously explained in FIG. 7. As can be seen, the rear support panel does include its upright panel 22, its upper and lower flanges 24 and 25, respectively, the front panel 26, and the supporting flange 28. In addition, side flanges, as at 155 are provided integrally formed to either side of the panel 154, to add reinforcement thereat, and to facilitate the mounting of this panel intermediate the pair of side walls 11 and 12, as previously explained. What is significant, though, is that it can be clearly seen from these figures that the various electrical controls, electronic controls, valves, thermostats, filters, timers, and the like, all mount upon this particular rear support panel, so that when the brewer is initially fabricated, all of these controls can be installed at one time, through the insertion of this ladened panel into the brewer assembly, and likewise, when a malfunction occurs, the entire panel and the controls can be readily removed, and replaced with another, to significantly reduce servicing down time to a minimum. As previously explained, the entire support seats through the apertures 25a upon the pins 42 of the base 38.

FIGS. 48 through 51 disclose a similar type of rear support panel 156, showing a variation upon the mounting of the various components thereon, but otherwise fabricated from a single blank of metal, or the like, to hold the various controls as explained.

Figure 52:
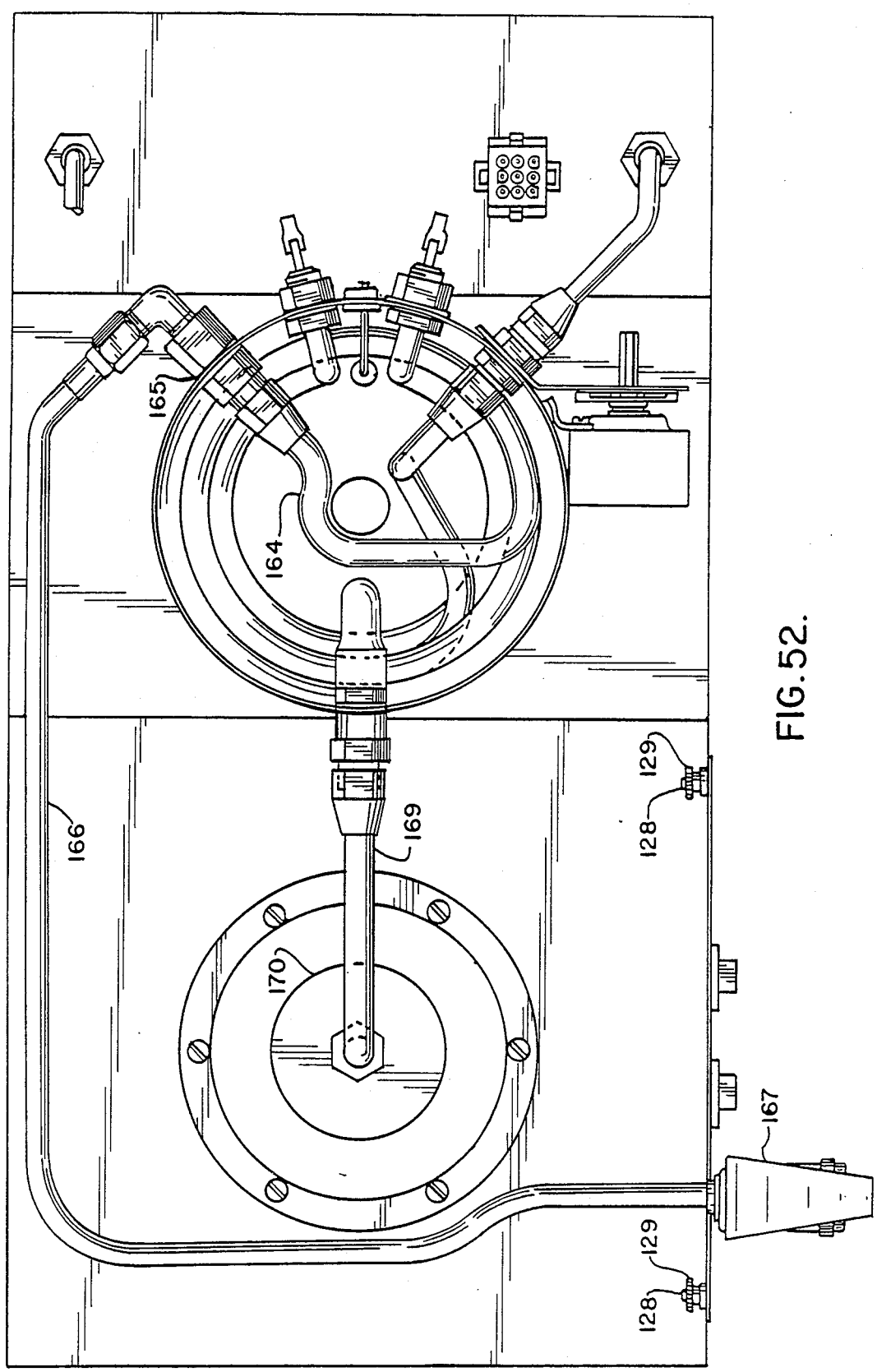
FIG. 52 is a top view of one of the brewers disclosing the location of its water heating tank, the controls, its spray head assembly, and the supplemental hot water faucet for use in conjunction therewith.
Figure 53:
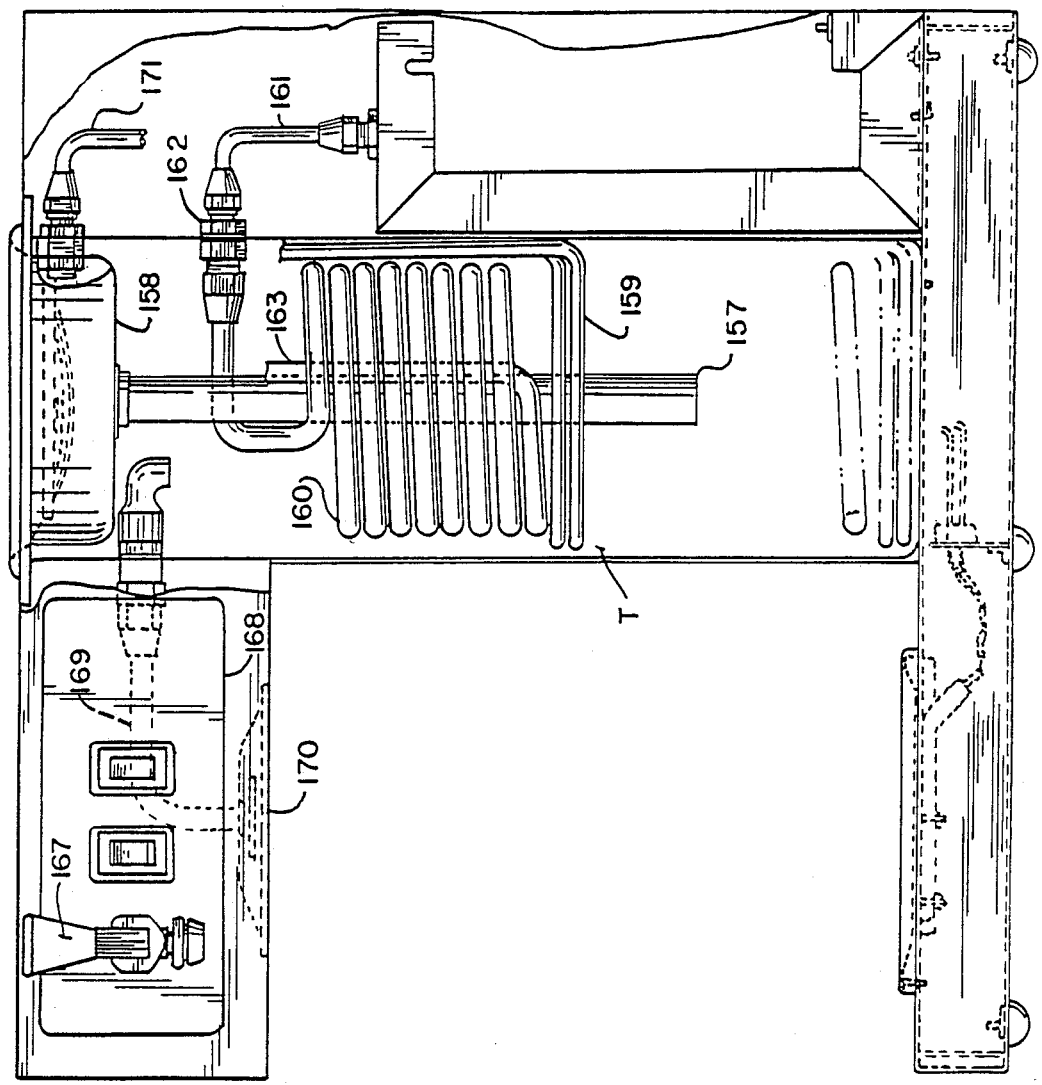
FIG. 53 is a side view thereof, with a side wall partially broken away.
Figure 54:
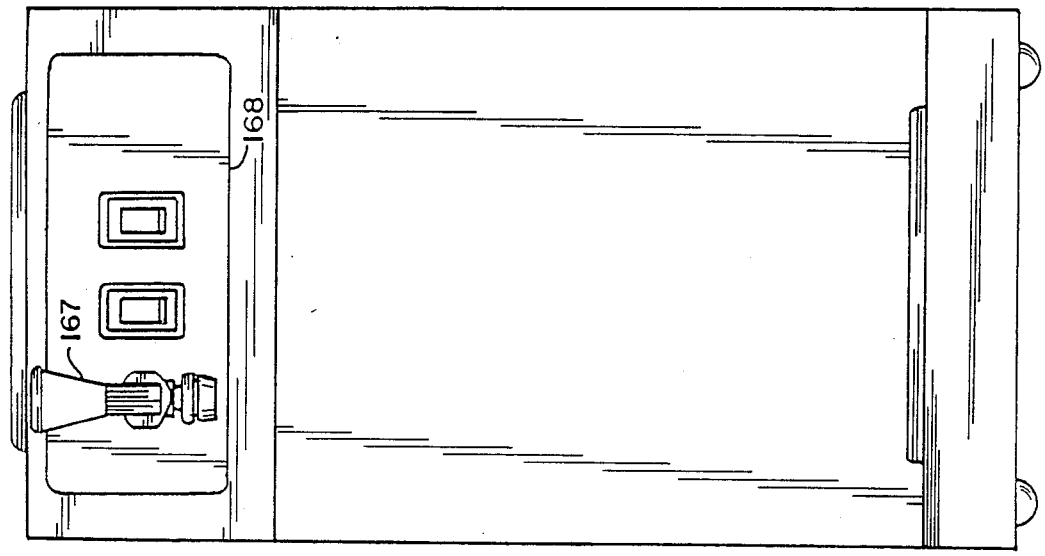
FIG. 54 is a front view thereof.

FIGS. 52 through 54 show a variation upon the brewer wherein, once again, an auxiliary supply of water is heated for conveyance to a faucet, for independent dispensing. As can be noted, in this particular instance, the water heating tank T has its intake tube 157 contained therein, with water poured into its bowl shaped pan 158, either by the pour-in method, or by automatic cold water delivery, in the manner as previously described, being deposited directly through the tube 157 and into proximity near the bottom of the tank T. The heating coil 159 provides for heating of the water contained within the tank T, but in addition, it can be seen that a coiled tube type of auxiliary water flow line 160 is arranged within the tank, at approximate its midpoint, where the water within the tank will have been previously heated, so that any water that flows through the flow line 161, from an external source, and through the junction 162, provided through the wall of the tank T, enters into the coiled heater 160, is heated therein by conduction, through the transfer of heat from the heated water, and the submersion heater 159, located within the tank T. From this the supplemental water source, now heated, rises through the tube 163, upwardly through the flow line 164 and out of the junction 165 for transfer through the flow line 166 and to the faucet 167, which has been mounted onto either the side or front of beverage brewer, and more specifically upon its control switch plate 168, in the manner as previously described. In this particular instance, through the manipulation of this faucet 167, an independent source of hot water can be obtained by the user, without drawing off any of the measured and gauged water contained within the tank T, and which has been separately and mainly heated for providing a source of hot water for delivery through the flow line 169 and to the spray head assembly 170, for delivery of its water to a beverage brewing basket The difference between this particular invention, as shown herein, and that which has been explained in FIG. 32, is that the coiled auxiliary water flow tube 160 is arranged at approximately the midpoint of the tank, above its heater, so as to be exposed to the heat generated within the heater 159, and the hot water contained within the tank T. In addition, instead of using a pan style of pour-in receptor as previously explained heretofore in this application, such as the pan P shown in FIG. 8, and elsewhere, in this particular instance, a bowl form of water receptor 158, that fits within and mates with the top of the tank T, is disclosed. The automatic delivery of water to the bowl 158 can be attained through the flow line 171 with its delivery of water to the bowl 158 being controlled by a valve, such as the valve 55, as previously defined.

FIGS. 55 through 58 disclose in greater detail the fabrication of the various side walls 11 and 12, as previously identified with respect to the description of the housing components as explained in FIG. 12. In this particular instance the left side wall 11 is shown, but the right side wall comprises and is fabricated as a mirror image thereof. As disclosed, and as previously explained, the wall includes the upright portion 13, the integral cantilevered portion 14, and the fabricated opening 15 provided therethrough. Such openings are designed for either holding the control switch panel 8, or the closure plate 7, as previously explained. As can be noted in its top view in FIG. 56, along the top edge of the wall 11 there is provided an integral inturned flange 172, and which has threaded lugs 173 soldered, welded, or otherwise secured to its under surface, and which accommodates the various fasteners such as threaded screws, that secure through the top wall 34, for holding it firmly in place upon the top of brewing apparatus. In similar fashion, the bottom of the wall 11 has an integral inturned flange 174, and which is useful for mounting of this side wall, and the upright column means of the brewer, onto the base member 2, as previously defined. It can be seen at various apertures, as at 175 are provided therethrough, for accommodating the insertion of fasteners therein. As can be noted in FIG. 57, which is a tack edge view of the side wall 11, various threaded fasteners, as generally shown at 176, are welded to the interior surface of the said wall, and are disposed for accommodating the support of various components thereon, such as the rear support panel 154, when it is installed, such as through the insertion of its located slots 177 onto select of the aligned fasteners 176, as during installation. See also FIGS. 12, 45 and 46. Likewise, the upper fasteners 178 are disposed for mounting of the transverse bracket 32, during its installation, as by inserting through their aligned apertures. These are examples as to how the various structural components, such as the side walls, of this brewing apparatus are prefabricated, shaped into particular configurations, have their fasteners readily adhered thereon, in order to facilitate the prompt assembly of the brewing unit into one of the modular forms as explained for this invention.

FIGS. 59 through 61 show the front panel, or the staggered front wall 16, of this invention, in its various views. As can be seen, the wall does include its upright portion 17, its forwardly extending portion 18, and the upright front wall 20, as previously explained. There are a series of formed flanges, as at 179, integrally formed generally extending rearwardly or upwardly from the various segments of the front wall, with these flanges each incorporating prelocated apertures, as at 180, therethrough, and through which the various side wall fasteners, such as previously explained at 176, locate therethrough for accommodating the mounting of the front wall to the side walls during brewer fabrication. As can be also seen in FIG. 59, a variety of fastener lugs 181 are disposed upon the upper surface of the forwardly extending wall 18, and accommodate the various fasteners therein that secure the rails 54 and 55, in place, once they are installed either in their front to rear configuration, or in the transverse position, depending upon whether a front or side loading for the brewing basket is required. As can also be seen, there are a series of threaded fasteners 182 extending upwardly from the surface 18, and these fasteners are welded or soldered into position for accommodating the installation of the spray head assembly 87 thereon. These screws cooperate with, for example, the threaded nuts 107, for securement of the spray head assembly in place.

FIGS. 62 through 64 disclose the transverse support 32, which is generally arranged intermediate the upper back corners of the side walls or panels 11 and 12, to provide stability or the structure at that location, and to form part of the upper edges of the unit for support and installation for the top wall or cover 34. This particular component, as are many of the components for this invention, is fabricated from a single and unitary stamping, into the configuration as noted in FIG. 12, and as shown in its various views in the identified figures just alluded to. The device simply includes the stamping bent into an angular configuration, having an upper flange 32a and an integral downwardly depending flange 32b, with a downwardly depending flange having tabs 32c extending forwardly, and incorporating a series of apertures therein, as noted at 32d, providing the spacing through which select of the fasteners, as 178, may insert, for securement of this transverse support to the upper back corners of these walls 11 and 12. Thus, this is another example as to how a singular stamping made from one sheet of metallic or other material may be pressed into its usable configuration, and readily available for use in installation within the housing and structure of this beverage brewer, providing for its ready assemble into its usable configuration, from a variety of modularized components.

Figure 65:
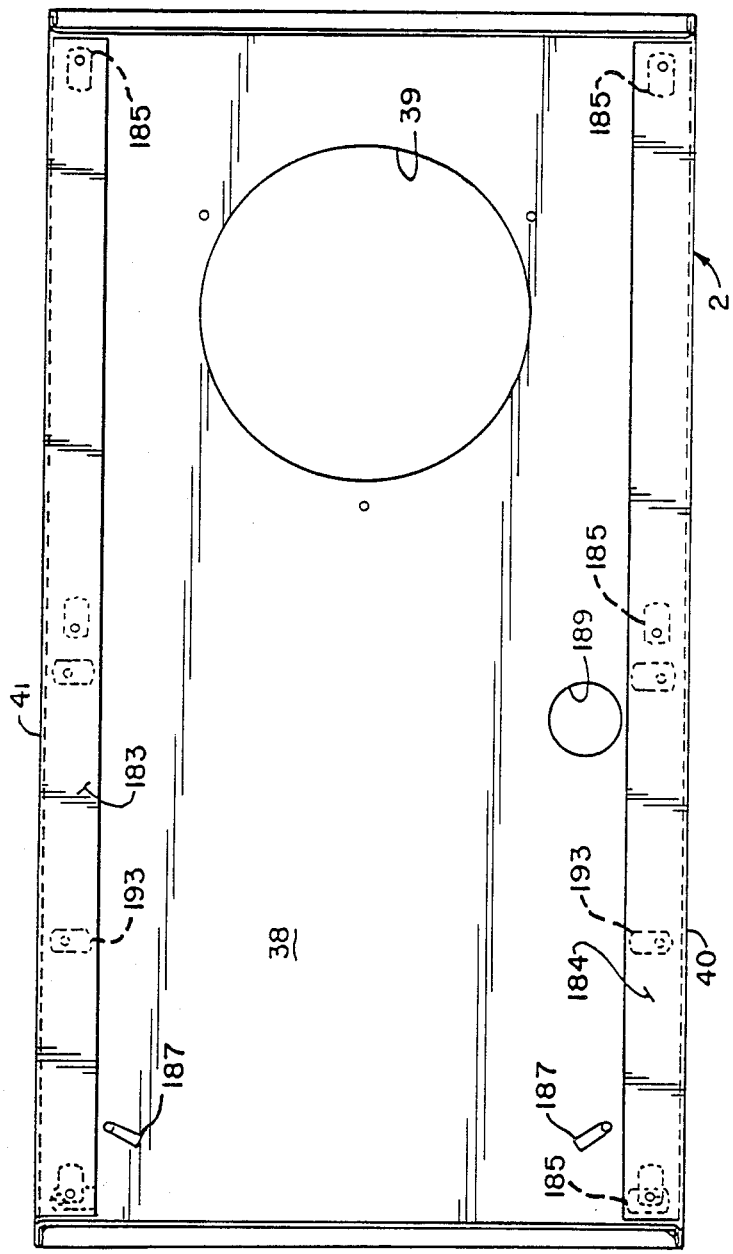
FIG. 65 is an underside view of the top panel.
Figure 66:
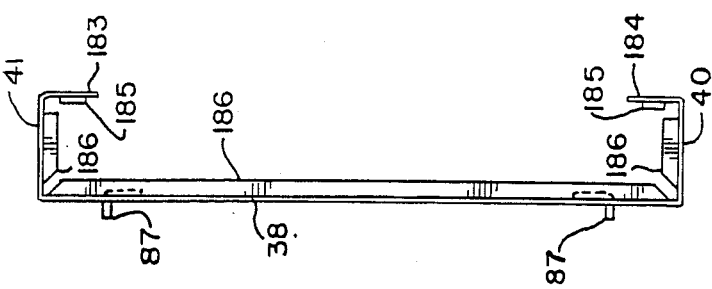
FIG. 66 is an end view thereof.
Figure 67:
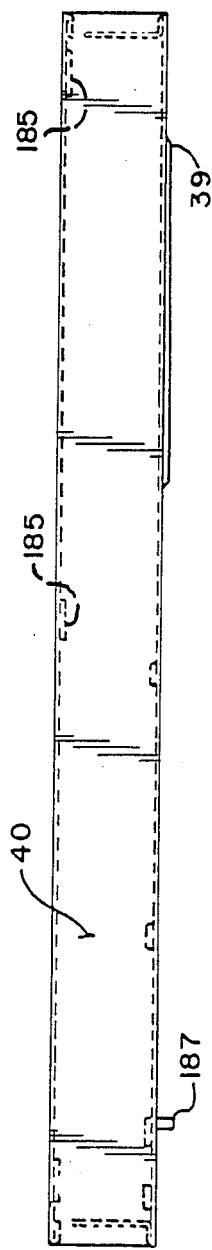
FIG. 67 is a side view thereof.
Figures 71, 72, 73:
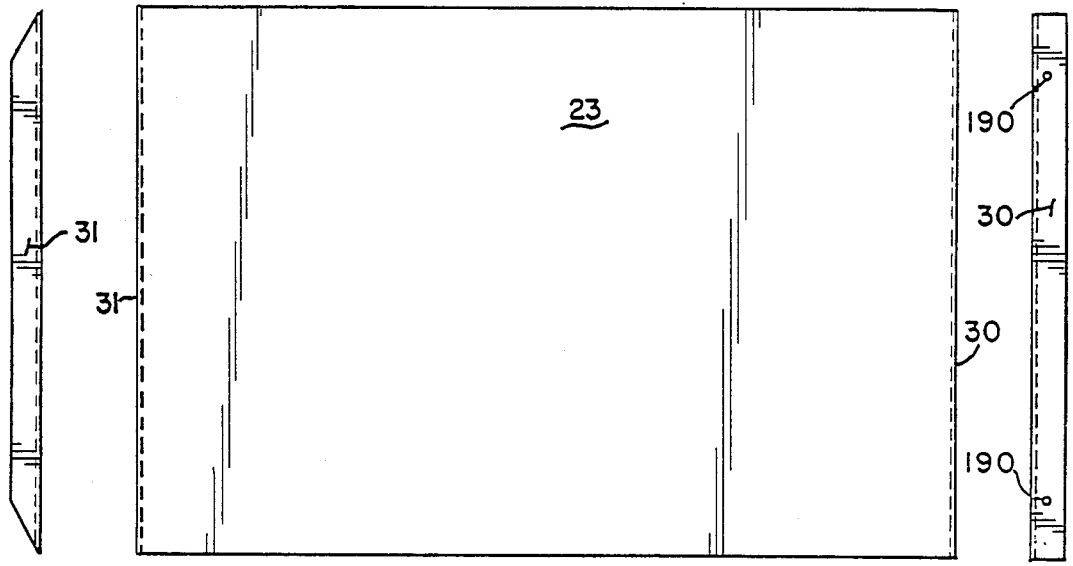
FIG. 71 is a view of the outside of the back plate.
FIG. 72 is a top view thereof.
FIG. 73 is a bottom view thereof.
Figure 74:
FIG. 74 is a side edge view thereof.

FIGS. 65 through 67 show the fabrication of the base member 2. As previously explained, this base member is formed of the upper support 38, which has the aperture 39 formed therethrough for mounting of a warming unit upon it. The upper support 38 includes the integral side flanges 40, as previously reviewed, and which further include integral inturned lower flanges 183 and 184, respectively, and which contain select threaded openings therethrough, in addition to having retaining lugs 185 provided thereon, for furnishing means for securement of the padded mounts 49, and their threaded fasteners 50, thereto. Reinforcing flanges 186, corresponding to the flanges 41 previously generally defined, are bent and formed inwardly of the upper support wall 38, and the side flanges 40 and 41, in order to reinforce the base member at this location and to provide positioning for the lower plate 46. The upper support surface 38 includes a pair of upstanding pins 187, for support of the insulator plate 43, as will be subsequently analyzed. The base member 2 is further fabricated incorporating the lower plate 46, as previously described, and further incorporates the integral front and rear flanges 47 and 48, to close off the base member at these locations, when this lower plate is installed into position within the upper support 38, as previously described. This combination, when fabricated together, can be observed upon reviewing FIG. 12, as previously analyzed. The upright wall 52 that separates the base member 2 into front and rear compartments, is shown, and incorporates an insulated aperture 188 therethrough, and through which the electrical line extends for connecting with and providing electrical energy to any warming unit mounted through the upper support aperture 39. This transverse upright wall 52 is formed as an angle, as noted, to facilitate the weld or otherwise connection of its lower flange against the interior of the lower plate 46. Any electrical cable that extends through the insulated aperture 188 also passes through the upper support aperture 189 provided through the said upper support wall 38, as can be noted.

The back wall 23 for the assembly is also shown in FIGS. 71 through 74, and is similar in construction to that which has already been explained with respect to FIG. 12. It includes its back wall 23, having the lower and upper flanges, 30 and 31, respectively, with the bottom flange having the pair of aligned openings 190 therethrough, and disposed for fitting upon the pins 29, of the rear support panel, during its installation. This provides for automatic alignment of the back wall 23 with the upstanding flange 26 of the rear support panel, as the brewer is being assembled.

Figure 75:
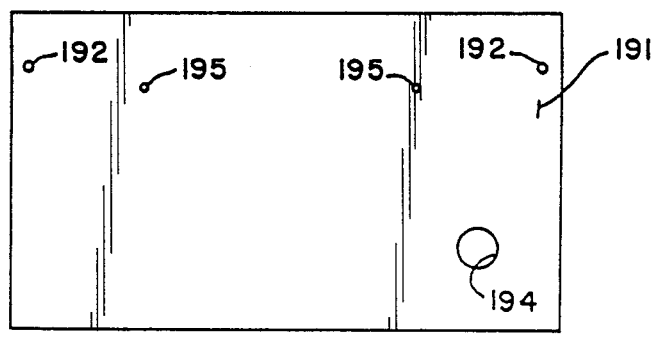
FIG. 75 is a top view of the tank locating plate.
Figure 76:
FIG. 76 is an edge view thereof.
Figure 79:
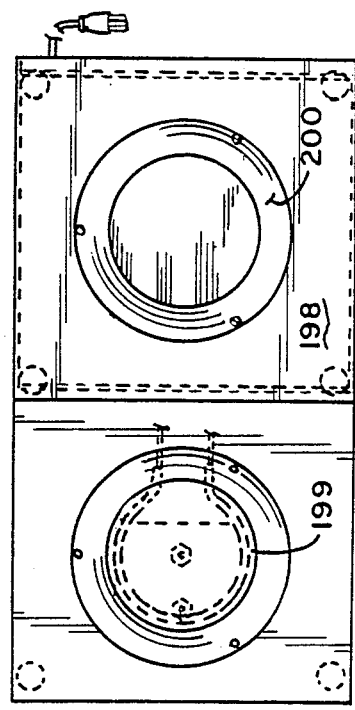
FIG. 79 is a top view thereof.
Figure 80:
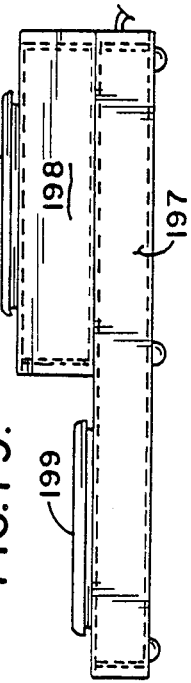
FIG. 80 is a right side view thereof.
Figure 81:
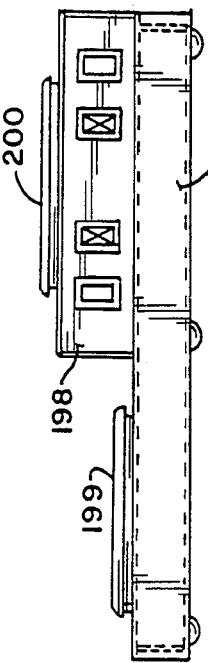
FIG. 81 is a right side thereof, disclosing a modification, with the transfer of its control panel to its right side.
Figure 78:
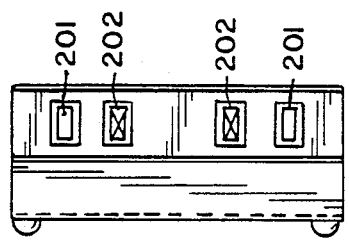
FIG. 78 is a front view of a double warming unit for use in conjunction with the custom beverage brewer of this invention.

A tank locating insulating plate as shown at 191 is shown in FIGS. 75 and 76. This plate rests upon the upper support surface 38, with its apertures 192 disposed for reception of a fastener that secures within the threaded lugs 193 of the upper support surface 38. The plate 191 includes an aperture 194 therethrough and through which the electrical line may pass to any warming unit mounted within the opening 39. A pair of pins 195 are loosely arranged upright upon the plate 191, and are designed for locating of the water heating tank T, positioned within the upright column section 1 during its installation.

An accessory to the structure of this brewing assembly is shown in FIGS. 78 through 81. This comprises a staggered type of double warming unit, as noted at 196, having a base unit 197 incorporating a riser unit 198, with each of these units incorporating their own warming units 199 and 200, as can be seen. This style of double warming unit can be accommodated, either by free standing or secured thereto, along the side of the base member 2, for providing supplemental sources of heat for warming of any additional beakers of beverage that may have been just previously brewed. In addition, various controls, such as the switches 201 and the lighted signals 202 provide means for turning on each of the individual warming units, with the lights indicating, when illuminated, when a particular warming unit is being electrically charged. This type of a double warming unit may mount adjacent the base member 2, as previously explained, or it can be set directly upon the top wall 4 of the beverage brewer, to provide supplemental heating of contained beverage at these locations.

Figure 77:
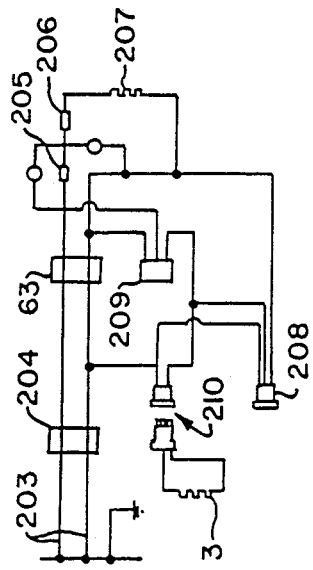
FIG. 77 is an electrical schematic for the brewer of this invention.

FIG. 77 provides a very brief electrical schematic for this invention. The incoming electrical lines are shown at 203, and connect through the lower terminal block 204, and then connect through the upper terminal block 63, as previously explained. The electrical charge is conducted through the thermostat 205, with a limit switch 206 providing means for furnishing cut-out of the electrical power in the event that a short of overheating occurs. A tank heater 207, that is embodied within, for example, the type of tank heating coil 98, as previously explained, furnishes electrical charge thereto. A timer jack 208 provides for the timed delivery of water to the water pan P, and eventually to the water heating T, when the automatic form of cold water inlet supplied mode is used. A lower warmer switch 209 furnishes electrical energy to any warming unit mounted, such as the warming unit 3, provided upon the base member 2. A plug-in jack 210 provides for the convenience of providing electrical connection therewith. A ready light 211 indicates when the unit is in operation, and functioning.

Variations or modifications to the subject matter of this invention may occur to those skilled in the art upon reviewing the summary of this invention, and the description of its preferred embodiment. Such variations or modifications, if within the spirit of this invention, are intended to be encompassed within the scope of any claims to patent protection issuing upon this development. The description of the preferred embodiment set forth herein, and as shown in the drawings, is done so for illustrative purposes only.

Having thus described the invention what is claimed and desired to be secured by Letters Patent is:

1. In a modular fabricated custom formed beverage brewer of the type incorporating a component formed housing containing a hot water heating tank regulated by controls for heating water delivered to the tank by one of an automatic cold water inlet supply or a pour-in type for heating and delivery of water to a spray head for discharge onto a basket of beverage grounds for dripping of a brewed beverage to a decanter for consumption, the improvement which comprises, said housing being convertible for multiple usage through replacement and relocation of select of its components during assembly of the brewer housing, said beverage brewer incorporating a base member, an upright column means for use in containing the water heating tank, and an upper cantilevered portion mounted upon and extending forwardly of the column means, said combined base member, upright column means, and upper cantilevered portion disposing a front, left, and right sides for the constructed brewer, and said brewer being adaptable for providing one of a front, left or right side delivery of the decanter to and from the brewer during its application, control switch means provided upon the upper cantilevered portion, said control switch means being connectable upon one of the front, left or right sides of the said cantilevered portion, said control switch means being interchangeable between said front, left or right sides of the said cantilevered portion, and wherein said base member being interchangeable between one of a forwardly extending base member, a vertically extending height increasing base member, or a laterally mounting base member for the beverage brewer.

2. The invention of claim 1 and wherein said forwardly extending base member extending forwardly a distance equivalent to the upper cantilevered portion, said base member incorporating a decanter supporting warming means which when functioning sustaining the heated temperature of any brewed beverage contained within the emplaced decanter.

3. The invention of claim 1 and wherein said vertically extending base member extending the combined height of the base member and the upright column, and the cantilevered portion to adapt the brewer to accommodate a decanter of increased height.

4. The invention of claim 3 and including a series of legs securing to the extending base member to increase the height of the brewer.

5. The invention of claim 1 and wherein said lateral mount warming unit providing at least one of a single or double warming unit for accommodating additional fresh decanters of coffee, or the like, for ready delivery by the user.

6. The invention of claim 1 and including a warming unit mounting upon the said base member.

7. The invention of claim 6 and including another warming unit provided upon the top wall of the brewer.

8. The invention of claim 6 and including a pair of warming units provided upon the top wall of the beverage brewer.

9. The invention of claim 8 and including a mount, and said mount securing upon the rearward portion of the top wall, and supporting the said other warming unit at an elevated position with respect to the front disposed warming unit supported upon said top wall.

10. The invention of claim 6 and wherein said beverage brewing warming unit laterally disposed of the base member incorporating at least one additional warming unit, a housing supporting said additional warming unit.

11. The invention of claim 10 and wherein said laterally disposed base member being separated into front and rear portions, the rear portion containing a first warming unit, the front portion containing a second warming unit.

12. The invention of claim 11 and wherein said rear portion being of higher elevation than the front portion, with one of said warming units being mounted upon the front portion, and the other of said warming units being elevated in its mounting upon the rear disposed portion, and electrical connection provided with the warming units for conducting electrical energy to said warming units for selective operations of said warming units during operations of the said apparatus, and control switch means interconnecting with the electrical connections to provide for conduct of electrical energy selectively to the various warming units upon selective operations of the apparatus.

13. The invention of claim 1 and including a switch panel comprising a plate, said switch panel incorporating the control switch means, said plate having means for accommodating the various brewer control switches thereon and the front, left or right side of the cantilevered portion to which said switch panel connects having an opening therethrough to provide clearance for mounting of said control switches and said plate thereon.

14. The invention of claim 13 and wherein each of the front, left and right sides of the cantilevered portion having an opening therethrough for accommodating the mounting of the switch panel thereto, and additional plate means provided for connection onto and for closing of the other said openings 15. The invention of claim 1 and including brew basket supporting rails connecting to the underside of the upper cantilevered portion, and said supporting rails being interchangeable between a rear-to-front disposition and to a side-to-side arrangement to accommodate the alternative usage of the brewer and its basket between a front and side installation.

16. In a modular fabricated custom formed beverage brewer of the type incorporating a component formed housing containing a hot water heating tank regulated by controls for heating water delivered to the tank by one of an automatic cold water inlet supply or a pour-in type for heating and delivery of water to a spray head for discharge onto a basket of beverage grounds for dripping of a brewed beverage to a decanter for consumption, the improvement which comprises, said housing being convertible for multiple usage through replacement and relocation of select of its components during assembly of the brewer housing, said beverage brewer incorporating a base member, an upright column means for use in containing the water heating tank, and an upper cantilevered portion mounted upon and extending forwardly of the column means, said combined base member, upright column means, and upper cantilevered portion disposing a front, left, and right sides for the constructed brewer, and said base member being interchangable between one of a forwardly extending base member, a vertically extending height increasing base member, or a laterally mounting base member for the beverage brewer.

17. The invention of claim 16 and wherein said height increasing base member designed for accommodating the usage of a tea holding decanter for brewing of tea during operations of the beverage brewer.

18. The invention of claim 16 and wherein said various base members designed for incorporating at least one warming unit mounting upon the said base members for use in maintaining the heated condition of any brewed beverage contained within a decanter resting upon said warming unit.

19. In a modular fabricated custom formed beverage brewer of the type incorporating a component formed housing containing a hot water heating tank regulated by controls for heating water delivered to the tank by one of an automatic cold water inlet supply or a pour-in type for heating and delivery of water to a spray head for discharge onto a basket of beverage grounds for dripping of a brewed beverage to a decanter for consumption, the improvement which comprises, said housing being convertible for multiple usage through replacement and relocation of select of its components during assembly of the brewer housing, said beverage brewer incorporating a base member, an upright column means for use in containing the water heating tank, and an upper cantilevered portion mounted upon and extending forwardly of the column means, said combined base member, upright column means, and the upper cantilevered portion disposing a front, left, and right sides for the constructed brewer, and said brewer being adaptable for providing one of a front, left or right side delivery of the decanter to and from the brewer during its application, control switch means provided upon the upper cantilevered portion, said control switch means being connectable upon one of the front, left or right sides of the said cantilevered portion, and said control switch means being interchangable between said front, left or right sides of the said cantilevered portion.

20. The invention of claim 19 and wherein said upper cantilevered portion having at least one decanter warming unit provided thereon and for use for accommodating additional fresh decanters of coffee for use in maintaining their warming condition during operations of the beverage brewer.

* * * * *